US009239872B2

(12) United States Patent
Casella dos Santos et al.

(10) Patent No.: US 9,239,872 B2
(45) Date of Patent: Jan. 19, 2016

(54) DATA STORE ORGANIZING DATA USING SEMANTIC CLASSIFICATION

(71) Applicants: Mariana Casella dos Santos, Ghent (BE); Frank Montyne, Sint-Martens-Latem (BE)

(72) Inventors: Mariana Casella dos Santos, Ghent (BE); Frank Montyne, Sint-Martens-Latem (BE)

(73) Assignee: Nuance Communications, Inc., Burlington, MA (US)

( * ) Notice: Subject to any disclaimer, the term of this patent is extended or adjusted under 35 U.S.C. 154(b) by 211 days.

(21) Appl. No.: 13/649,988

(22) Filed: Oct. 11, 2012

(65) Prior Publication Data

US 2014/0108424 A1    Apr. 17, 2014

(51) Int. Cl.
*G06F 17/30* (2006.01)

(52) U.S. Cl.
CPC .... *G06F 17/30598* (2013.01); *G06F 17/30604* (2013.01)

(58) Field of Classification Search
CPC ............... G06F 17/30442; G06F 17/30448; G06F 17/30522; G06F 17/30525; G06F 17/30613; G06F 17/30616; G06F 17/30619; G06F 17/30654; G06F 17/30598; G06F 17/30604
USPC .......................... 707/713, 739, 769, 771, 748
See application file for complete search history.

(56) References Cited

U.S. PATENT DOCUMENTS

| 5,309,359 | A  | * | 5/1994 | Katz et al. ............. 707/999.102 |
| 6,654,749 | B1 | * | 11/2003 | Nashed ........................ 707/765 |
| 7,493,253 | B1 |   | 2/2009 | Ceusters et al. |
| 2003/0233345 | A1 | * | 12/2003 | Perisic et al. ..................... 707/3 |
| 2008/0010274 | A1 | * | 1/2008 | Carus et al. ....................... 707/5 |
| 2009/0204605 | A1 | * | 8/2009 | Bai et al. ........................ 706/21 |
| 2013/0275448 | A1 | * | 10/2013 | Mirhaji ........................ 707/756 |

OTHER PUBLICATIONS

Florian et al., "A Statistical Model for Multilingual Entity Detection and Tracking," Proceedings of the Human Language Technologies Conference 2004 (HLT-NAACL'04).

* cited by examiner

*Primary Examiner* — Vincent F Boccio
(74) *Attorney, Agent, or Firm* — Wolf, Greenfield & Sacks, P.C.

(57) ABSTRACT

Data stores that store content units and annotations regarding the content units derived through a semantic interpretation of the content units. When annotations are stored in a database, different parts of an annotation may be stored in different tables of the database. For example, one or more tables of the database may store all semantic classifications for the annotations, while one or more other tables may store content of all of the annotations. A user may be permitted to provide natural language queries for searching the database. A natural language query may be semantically interpreted to determine one or more annotations from the query. The semantic interpretation of the query may be performed using the same annotation model used to determine annotations stored in the database. Semantic classifications and format of the annotations for a query may be the same as one or more annotations stored in the database.

20 Claims, 10 Drawing Sheets

DATA STORE ORGANIZING DATA USING SEMANTIC CLASSIFICATION

BACKGROUND

Data stores store data for later access. A database is an example of a data store.

A database organizes data into tables. A database table organizes data into one or more fields, each storing a type of data. A database may include multiple tables that have different fields and store different types of data. When data is entered into a table, a new row typically is created in the table for the data and the data is entered into a field corresponding to the type of the data. When multiple pieces of data to be stored in a table are related to one another, the pieces of data may be entered into fields in the same row of the table.

Data warehouses are a special form of database. A data warehouse may store data that also is stored elsewhere in other data stores, including in other databases. A data warehouse may receive data from these other sources and store the data. In this way, data from multiple sources is stored together in one location and can be accessed centrally. In some cases, a data warehouse may process data prior to storage, such that the data from the sources is stored in a different form in the data warehouse, or such that new data is created and stored based on the data from the sources. A data warehouse, like other databases, may store data according to tables, fields, and rows.

SUMMARY

In one embodiment, there is provided a method for searching a database of information. The database of information comprises information related to a plurality of content units, the information related to the plurality of content units comprising a plurality of stored annotations related to the plurality of content units. The plurality of stored annotations were generated by processing the plurality of content units using a first clinical semantic interpretation engine. The first clinical semantic interpretation engine processes the plurality of content units according to at least one annotation model that defines at least one annotation type identifying information having a medical significance. Each stored annotation of the plurality of stored annotations comprises a semantic label and content of the stored annotation. The method comprises receiving a query and determining at least one query annotation relating to the query by processing the query using a second clinical semantic interpretation engine. The second clinical semantic interpretation engine processes the query according to the at least one annotation model. The at least one query annotation comprises a first query annotation, and the first query annotation comprises a semantic label for the first query annotation and content of the first query annotation. The method further comprises searching the database based at least in part on the first query annotation.

In another embodiment, there is provided at least one computer-readable storage medium having encoded thereon computer-executable instructions that, when executed by at least one computer, cause the at least one computer to carry out a method for searching a database of information. The database of information comprises information related to a plurality of content units, the information related to the plurality of content units comprising a plurality of stored annotations related to the plurality of content units. The plurality of stored annotations were generated by processing the plurality of content units using a first clinical semantic interpretation engine. The first clinical semantic interpretation engine processes the plurality of content units according to at least one annotation model that defines at least one annotation type identifying information having a medical significance. Each stored annotation of the plurality of stored annotations comprises a semantic label and content of the stored annotation. The method comprises receiving a query and determining at least one query annotation relating to the query by processing the query using a second clinical semantic interpretation engine. The second clinical semantic interpretation engine processes the query according to the at least one annotation model. The at least one query annotation comprises a first query annotation, and the first query annotation comprises a semantic label for the first query annotation and content of the first query annotation. The method further comprises searching the database based at least in part on the first query annotation.

In a further embodiment, there is provided an apparatus comprising at least one processor and at least one computer-readable storage medium. The at least one computer-readable storage medium has encoded thereon executable instructions that, when executed by the at least one processor, cause the at least one processor to carry out a method for searching a database of information. The database of information comprises information related to a plurality of content units, the information related to the plurality of content units comprising a plurality of stored annotations related to the plurality of content units. The plurality of stored annotations were generated by processing the plurality of content units using a first clinical semantic interpretation engine. The first clinical semantic interpretation engine processes the plurality of content units according to at least one annotation model that defines at least one annotation type identifying information having a medical significance. Each stored annotation of the plurality of stored annotations comprises a semantic label and content of the stored annotation. The method comprises receiving a query and determining at least one query annotation relating to the query by processing the query using a second clinical semantic interpretation engine. The second clinical semantic interpretation engine processes the query according to the at least one annotation model. The at least one query annotation comprises a first query annotation, and the first query annotation comprises a semantic label for the first query annotation and content of the first query annotation. The method further comprises searching the database based at least in part on the first query annotation.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
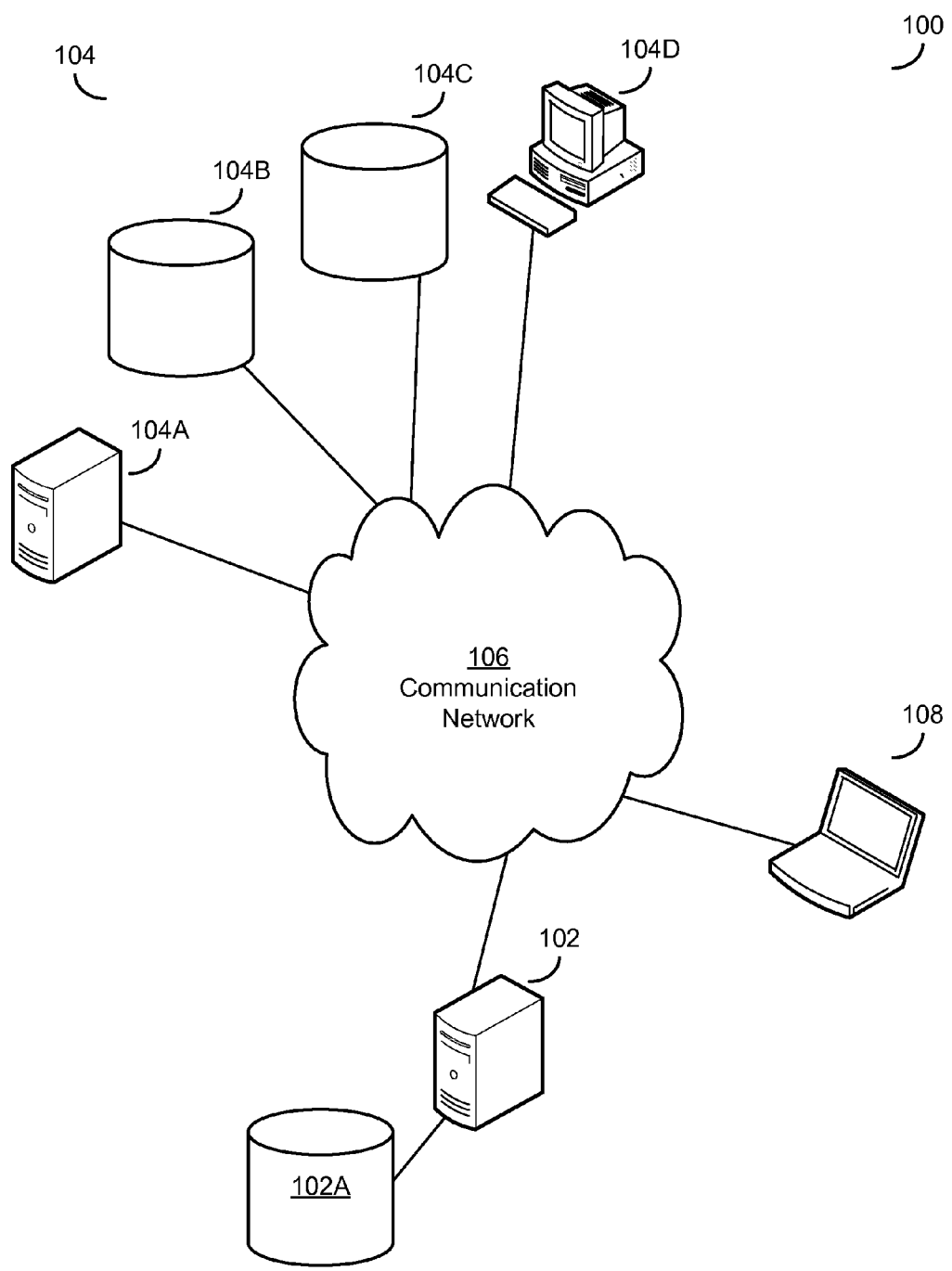
FIG. 1 is an illustration of an exemplary computer system in which some embodiments may operate.

Applicants have recognized and appreciated that databases (which, as used below unless indicated otherwise, includes data warehouses) organize data into tables, fields, and rows based on the way in which the data stored in the database is expected to be used. More particularly, the organization is based on the way in which the database is expected to be queried. When a database designer determines that users of the database (e.g., human users and non-human users, such as software programs) will often seek to access multiple types of data stored in the database at the same time, the database designer may design the database so that a small number (e.g., one or a few) of queries can be used to retrieve those types of data, and so that these queries will be processed quickly and efficiently by the database. To do so, the database designer may place database fields that store the types of data that will be accessed together in the same table of the database, so that the data can be quickly retrieved from a single table. Additionally, the database designer may create one or more indices for the database table that correspond to one or more of the fields that will store the types of data that will be accessed together. Creating an index for a field of a database table can increase the efficiency of retrieving data from the table using a query having search parameters regarding the field. Because of this efficiency gain, some database interfaces restrict permitted search queries to only those that search on fields that are indexed, meaning that non-indexed fields cannot be directly searched (though data in non-indexed fields could be retrieved along with other data in response to a search of an indexed field). In some databases, any number of indices can be created for a database table. However, as the number of indices for a table increases, the storage space necessary for storing the table grows, as does the amount of processing time to store new data in the table. Thus, a database designer may evaluate expected queries to identify which of the types of data stored in the database will often serve as search parameters of queries, and set indices for database fields that correspond to the identified pieces of data.

Applicants have therefore recognized and appreciated that the design of a database often involves a detailed analysis of the queries that are to be made of the database and the types of data that will be retrieved from the database. Additionally, when the database, or the data stored in the database, is to be used in a new way, or when new data or a new type of data is to be stored in the database, it is conventional that the database may be reorganized to permit new queries to be processed efficiently. The reorganization may involve adding new tables or fields, or adding new indices. When new tables, fields, or indices are added, the detailed analysis of the queries that will be made of the database conventionally is repeated. Applicants have further recognized and appreciated that this reorganization of databases to accommodate new data and new queries may be performed often on conventional databases, and that database designers spend a significant amount of time on the complex and often manual task of analyzing queries that users are expected to submit to the database, as well as the types of data that users are expected to seek to retrieve from the database together.

Applicants have also recognized and appreciated that data to be stored in a database may be provided to the database in many different forms, including in some forms that may be inconsistent with the organization of the database. This may occur, for example, when data is being imported into a data warehouse from another database, and, prior to storage, may need to be changed from the organization of the other database to the organization of the data warehouse. Accordingly, in some cases, before data can be stored in a database, the data is converted to the organization of the database in which it will be stored. Before such a conversion can be carried out, a database designer conventionally determines how to perform the conversion between the original organization and the new organization that is to be used for the data in the database into which it will be used. Determining how to convert the data and/or the actual conversion is often a complex, manual process. Additionally, this determination and conversion may be repeated each time new data is to be input from one database to another, or when the database is to be reorganized.

Conventional databases therefore present various management difficulties and challenges for database designers, who may spend a great deal of time organizing and reorganizing databases to permit efficient processing of queries and newly-received data.

Applicants have further recognized and appreciated that while analyzing queries in the above described way permits often-used queries to be processed efficiently, it requires that queries use the predefined structures and terminology. Conventional databases therefore require that users provide queries using these predefined structures and terminology. However, Applicants have recognized and appreciated that, in some cases, it may be advantageous to permit users to query a database using any suitable form of query and any suitable phrasing, rather than predefined structures. For example, such queries may be in the form of natural language queries. In natural language queries, a user may provide the query to the database in any format or phrasing the user desires and the database may process the query to determine the type of data the user desires in response to the query. Natural language queries may be advantageous because they permit users to specify a query without regard to structure or terminology, enabling users to focus their energies on what information the users would like to retrieve rather than on ensuring a query uses a pre-defined structure.

Applicants have also recognized and appreciated that conventional databases do not store information in ways that make all available data easily accessible to users of those databases. Users may not be able to specify parameters of search queries based on some types of data stored by a conventional database, and some types of data may not be stored in fields of the conventional database directly related to those types of data and thus those types of data may not be directly retrievable from the database. For example, content units that are stored in databases may include both structured data and unstructured data, and unstructured data may not be easily accessible in the conventional database. Structured data includes data that is formatted prior to storage in a way that identifies the data and includes the content of the data. Unstructured data, in contrast, is not formatted prior to storage in any particular manner, but instead the content of the data may be arranged without any identification of the data. Freeform text, such as a transcription of a medical or other dictation, is an example of unstructured data. The words, symbols, and numbers included in the text are stored individually as content of the text, but without a structure imposed on the words, symbols, and numbers. Applicants have recognized that storing information like text only in an unstructured format in a database limits the ability of users to who might be interested in the information contained in the unstructured data from identifying and retrieving the information. While users may be able to search for the information based on the precise content of the information (e.g., the exact words included in text), the unstructured data may include data that extends beyond the precise content of the information, and this other data is not traditionally available through search. For example, with respect to text, the text may include data in the form of the words, symbols, and numbers explicitly included in the text, but may additionally include data implicitly expressed in the text, such as underlying meanings expressed by the words, symbols, and numbers. For example, unstructured data that includes a physician's dictation that "patient's temperature is 39 degrees Celsius" includes information on a patient's fever (i.e., a patient's internal temperature above 37.5 degrees Celsius), even though the term "fever" does not appear in the unstructured data. When the term "fever" or the corresponding medical term "pyrexia" does not appear in the unstructured data, it may not be possible with conventional databases to retrieve the information about fever using a search query that includes the words "fever" or "pyrexia," or that includes other information related to fevers, even though the unstructured data relates to fever. The information is instead retrievable using the term "temperature" or the exact temperature of "39 degrees Celsius," which in some environments may not be terms that would often be used as search parameters by users looking for information regarding patients with fevers.

Applicants have recognized and appreciated that conventional databases do not permit implicit data to be directly searched and retrieved when the implicit data is stored in unstructured data such as freeform text.

In view of the foregoing, Applicants have recognized and appreciated that advantages can be achieved by a data store that stores data according to a semantic classification of the data. In particular, Applicants have recognized and appreciated that when a semantic interpretation process is performed on data to be stored in a data store to determine some underlying meaning of the data and the data is stored according to a semantic classification determined from such an interpretation, the data store may be able to efficiently process many different queries, including natural language queries. Additionally, when data is stored according to semantic classification, when new types of data are to be stored in the data store, the data store may not need to be reorganized, as the new data may be stored using the same semantic classifications and using the same organization (e.g., tables and fields) as were used previously to store other data. Further, when data is stored according to the semantic classification, a designer of the data store may not need to determine how to process and organize data for storage in the data store, as the data can be processed using a semantic interpreter and stored using the semantic classifications. Examples of types of semantic classifications are described below.

Described below are various illustrative embodiments of data stores (including databases) that store content units and annotations regarding the content units derived through a semantic interpretation and classification of the content units. As discussed in detail below, an annotation may be a structured unit that identifies information that is explicitly or implicitly included in a content unit. It should be appreciated that data stores operating according to techniques described herein are not limited to operating with or storing any particular form of content unit(s). Rather, embodiments may operate with content that is arranged into units in any suitable manner. In some embodiments, a content unit may be arranged as a file, though embodiments are not limited to operating with files. The content of a content unit may include text data, binary data (e.g., audio data, image data, executable instructions), and/or any other form of data. In one non-limiting example, a content unit may be a text document including unstructured natural language text and/or structured text data, where the structured text data (if any) is formatted or encoded to identify data of the structured text. Structured text data of a document may include data arranged in tables or forms of a document, or the structured text may be arranged in any other suitable manner. In another non-limiting example, one content unit may be the structured text data of a text document and another content unit may be the unstructured data of a text document.

In some embodiments, a data store that stores content units and annotations may be implemented as a database (e.g., a data warehouse or other type of database). In embodiments that implement the data store as a database, the database may be implemented as a relational database, or in any other suitable manner using any suitable database model.

Databases operating according to techniques described herein may organize annotations in the databases in any suitable manner according to any suitable semantic classification of the annotations. In some embodiments, annotations produced by a semantic interpretation (also referred to as a semantic analysis) of a content unit to be stored in the database may be formatted by the semantic interpreter according to an annotation model that specifies the annotations that may be produced. The annotation model may specify annotations by specifying a format of a structure that may be used to organize unstructured data corresponding to each type of annotation as structured data for storage in a database. The annotation model may also specify an annotation by identifying a semantic classification for each type of annotation. A semantic classification may be an identifier for a type of annotation and may identify a meaning or a type of meaning of the annotation. An annotation may also include one or more pieces of information that may serve as content of the annotation. An annotation may include any suitable content, including content related to one or more other annotations and/or content related to a content unit to which the annotation relates. Content of an annotation may be explicitly included in the content unit to which the annotation relates or may be explicitly included as content of another annotation to which the annotation relates. Alternatively, content of an annotation may be implicitly included in a content unit to which the annotation relates or may be implicitly included as content of another annotation, and may be determined from the content unit or other annotation through semantic interpretation. It should be appreciated, however, that these are merely examples of ways in which content of an annotation may relate to a content unit or to one or more other annotations, as content of an annotation may be derived in any other way from any other source, as embodiments are not limited in this respect.

In some embodiments, annotations for a content unit may include structural annotations and/or semantic annotations. Structural annotations may identify structural elements of a content unit and may include, for example, annotations that identify grammatical and/or organizational units of a content unit, non-limiting examples of which include sections, paragraphs, sentences, and words included in the content unit. Semantic annotations may identify a meaning expressed in a content unit, including a meaning expressed by an entirety of a content unit or by a portion of a content unit. In some cases, where a content unit is a text document, a semantic annotation may identify a meaning expressed by a word, sentence, or section of the content unit.

The database may store the annotations according to semantic classification in any suitable manner, as embodiments are not limited in this respect. In some embodiments, when annotations are stored in a database, different parts of an annotation may be stored in different tables of the database. For example, in some such embodiments, one or more tables of the database may store all semantic classifications for the annotations, while one or more other tables may store content of all of the annotations. Additionally, in some embodiments that store different parts of annotations in different tables, different types of content of annotations may be stored in different tables based on the form of the content. As one non-limiting example, one table may store numbers (e.g., integers, or floating point numbers, large integers, etc., or two or more of those), another table may store text, another table may store binary data (e.g., audio data, image data, executable instructions). Storing the semantic classifications in one table and different forms of content into other tables may provide advantages in some embodiments. For example, in some embodiments, when the semantic classifications and content are stored separately in this way, each table of the data that stores a portion of an annotation may include a field that stores a single type of data (e.g., text, numbers, etc.) corresponding to that portion of the annotation. In each table, this field can be indexed to enable quick and efficient retrieval of data from the table when that field is used as the basis of a search parameter for a query of the table. Because a table may primarily store the data of that one particular field, queries of the table may be likely to take advantage of the index and the query may be efficiently processed. As mentioned above, though, it should be appreciated that embodiments are not limited to storing annotations in any particular manner, and are not limited to storing annotations divided between different tables of a database as discussed above.

Thus, in some embodiments, a database is provided that stores content units using annotations and semantic classifications. When a content unit (e.g., a document) is to be stored in the database, the content unit may be semantically interpreted to determine one or more annotations for the content unit. For each annotation, a semantic classification for the annotation may be stored (e.g., in one table that is indexed by the field storing semantic classifications) and content of the annotation may also be stored (e.g., in another table that is indexed by the field storing the content). The content unit from which the annotation(s) is determined may also be stored in the same database or in a different database, and annotations stored in the database may be stored with a link to the content unit to which the annotations relate.

In embodiments that employ a database that stores content units and annotations according to semantic classification, the database may be searched in any suitable manner to retrieve data from the database, as embodiments are not limited in this respect. In some embodiments, a user may be permitted to provide to the database queries having any suitable format and phrasing, including natural language queries. In some such embodiments, when a natural language query is received from a user, the query may be semantically interpreted to determine one or more annotations from the query. In some embodiments, the semantic interpretation of the query may be performed using the same annotation model used to determine annotations stored in the database. When the same annotation model is used to interpret the query, the semantic classifications and format of the annotations for the queries may be the same as the semantic classifications and format available for one or more annotations stored in the database. In some embodiments, when the same annotation model is used, a semantic interpretation engine for interpreting content units may use a different copy of the same annotation model that is used by a semantic interpretation engine for interpreting queries. In other embodiments, a different annotation model may be used to interpret a query than was used to interpret content units. An annotation model for the query that is different may, for example, be formatted in a different way or include different (e.g., more or less) content than the annotation model that was used to interpret the content units. However, in some cases, the different annotation model that is used for the query interpretation may be compatible with the annotation model that is used for the interpretation of content units. The compatible annotation model may produce annotations having the same content (e.g., the same semantic classifications) and format as the annotation model that was used to interpret content units to produce the annotations stored in the database. Alternatively, in some embodiments annotations produced by the compatible annotation model may be able to be reformatted or otherwise transformed to have the same content and format as annotations defined by the annotation model that was used to interpret the content units. In other embodiments, as another example, the different annotation model that is used for the query interpretation may produce annotations having the same content and format as the annotation model used to interpret content units to produce the annotations stored in the database, but the different annotation model may be formatted differently, stored on disk differently, or different in any other way(s) that does not affect the annotations produced. Once annotations are determined from the query using an annotation model, the annotations may be used to search the database for matching annotations that were determined from content units. When matching annotations are identified in the database, the content unit(s) corresponding to the matched annotations may be retrieved from the database and provided as a result of the query.

As an example of the types of advantages that may be offered by searching using annotations determined from natural language queries, in some embodiments, when a natural language query is used, the user may be free to specify a search in any manner, including using search terms that do not explicitly correspond to terms used in documents to be searched. For example, in some embodiments, if a user provides a natural language query to request all documents describing patients having "fevers," annotations such as symptom annotations may be determined from the query. A symptom annotation may have a semantic classification of "Symptom" and include the content "fever." In embodiments that operate in this way, documents that are retrieved in response to the query include documents for which a semantic interpretation produced a symptom annotation with the content "fever." Such a symptom annotation may have been created by a semantic interpretation of a document that mentions "patient's temperature is 39 degrees Celsius," given that 39 degrees is above the fever cutoff of 37.5 degrees Celsius.

Thus, in these embodiments, even though the document did not use the exact term "fever," a user's search for "fever" may retrieve the document due to the correspondence between annotations determined from the document and from the query.

Exemplary databases that operate according to the foregoing techniques, and exemplary techniques for processing content units for storage and for querying databases using natural language queries, are described below. It should be appreciated, however, that the examples below are merely illustrative of how techniques described herein may be implemented and that embodiments are not limited to operating according to these examples.

In some of the examples below, content units to be stored are described as clinical (including healthcare) documents that include information relating to one or more clinical encounters, such as transcriptions of a dictation of notes by a physician or other healthcare provider of a patient encounter, patient health records, examination results, medical journal articles, etc. Additionally, in some examples described herein, the annotations determined from the content units are described as including annotations identifying medical meanings of the clinical documents (e.g., symptoms, diagnoses, medications, etc.) expressed in the clinical documents. It should be appreciated, however, that embodiments are not limited to operating with clinical information or with information relating to any other particular domain. Embodiments may analyze and store any suitable type of information.

FIG. 1 is an illustration of one exemplary computer system in which some embodiments may operate. The computer system 100 of FIG. 1 includes a server 102 that operates a database engine and manages a database 102A operating according to techniques described herein. The database 102A may store annotations regarding content units according to a semantic classification of the annotations, and may additionally store the content units to which the annotations relate. Content units to be stored in the database 102A may be received from any suitable source, including one of the sources 104A-D of content units. A source 104 may transmit a content unit to the server 102 via any suitable local-area and/or wide-area communication network 106, (including the Internet), or in any other suitable manner. In addition to storing content units and annotations, the server 102 may retrieve data from the database 102A in response to queries. FIG. 1 illustrates the computer system 100 further including a computing device 108 that may be operated by a user and may provide a query to the server 102 via the network 106. It should be appreciated, however, that a query can be provided to the server, or in any other suitable way. In response to receiving the query from the user and the device 108, the server 102 may perform a search of the database 102A based on the query, retrieve data from the database 102A based on the search, and provide results of the query to the computing device 108 for use by the user.

In the exemplary embodiment of FIG. 1, when the server 102 receives a content unit from a source 104 for storage in the database 102A, the database engine of the server 102 may determine one or more annotations for the content unit by semantically interpreting the content unit. In other embodiments, one or more components other than the database engine may perform the semantic interpretation of the content unit to produce one or more annotations, as embodiments are not limited in this respect. Exemplary techniques for semantically interpreting a content unit and exemplary annotations are described in detail below. Once the database engine of the server 102 (or another component) determines the annotations, the database engine may store the annotations in the database 102A. In some embodiments, the database engine may additionally store the content unit in the database 102A and the annotations may be identified in the database 102A as related to the content unit. In other embodiments, the database engine may store the content unit in a separate database or other data store and store in the database 102A data identifying a data store from which the content unit may be retrieved. Embodiments are not limited to storing content units in any particular manner.

Content units to be stored in the database 102A may be formatted in any suitable manner and may include any suitable content, examples of which are discussed above. For example, a content unit may be a file including text information related to a clinical encounter. The server 102 may receive content units to be stored in the database 102A from any suitable source 104A-D. FIG. 1 illustrates four examples of sources 104A-D (discussed below) of content units to be stored in the database 102A, though it should be appreciated that these examples are merely illustrative and that embodiments are not limited to operating with these sources of content units.

In the example of FIG. 1, each of the sources 104A-D is a source of clinical information and each of the sources 104A-D may be able to provide to the server 102 one or more content units comprising information relating to a clinical encounter. In one non-limiting example, a server 104A operates an automatic speech recognition (ASR) engine that receives speech input and produces as output results of a speech recognition performed on the speech input. The ASR engine of the server 104A may produce recognition results in response to receiving dictations from a clinician, such as a doctor or other healthcare provider or a medical researcher, regarding a patient, symptoms exhibited by the patient, diagnoses, or any other suitable topic of a clinician's dictations. The recognition results produced by the ASR engine may be provided by the server 104A to the server 102 as a content unit in any suitable form, including as unstructured text data. When the server receives a content unit including the recognition results, the database engine of the server 102 (or some other component) may semantically interpret the content unit and store one or more annotations and the content unit in the database 102A.

A database 104B storing structured data may be another source 104 of content units. The database 140B may store clinical content units that include structured data, for example, electronic health records for a patient. An electronic health record may include data that is encoded or organized in a certain manner, according to a format of the electronic health record. Each piece of data may be stored in the electronic health record in a manner that organizes the data and identifies the data, such as by identifying the data by a field of the health record to which the data relates. When a content unit including structured data is received by the server 102 from the database 104B, the database engine (or other component) may semantically interpret the content unit and store annotations in the database 102A. In addition, the database engine may store the content unit in the database 102A. When the content unit, including the structured data, is stored in the database 102A, the content unit may be stored as received or may be reorganized for storage according to any other structure or organization in the database 102A, as the techniques described herein are not limited in this respect.

Sources 104 of content units may also include a database 104C of content units that include both structured and unstructured data. The content units may be, for example, clinical content units such as medical journal articles that include structured data and unstructured data. The structured data of a medical journal article may relate to results of experiments conducted by researchers or regarding patients studied during research that led to the medical journal articles. The structured data of the medical journal article may be tabulated or organized in the journal article in some manner that identifies the data and a meaning of the data, such as by identifying a variable to which the data relates. The unstructured data of a medical journal article may include the text of the article and words, symbols, and numbers used in the medical journal article. When the server 102 receives content units from the database 104C, the database engine (or some other component) may semantically interpret the structured data and/or the unstructured data of the content units to determine annotations for the content units. Annotations for the content units may be stored in the database 102A. Additionally, in some embodiments the content units may be stored in the database 102A or elsewhere. The structured data of a content unit may be stored together with or separate from the unstructured data of a content unit, and the structured data may be stored as received or reorganized in any suitable manner prior to storage in the database 102A.

FIG. 1 also illustrates a client computer 104D that may serve as another source 104 of content units. The server 102 may receive content units from the computing device 104D, including clinical content units that may include documents created by clinicians regarding clinical encounters. Such documents may be structured or unstructured text documents, such as notes regarding a clinical encounter. When the server 102 receives a content unit from the client computer 104D, the content unit may be semantically interpreted to determine annotations, the annotations may be stored in the database 102A and, in some embodiments, the content units may also be stored in the database 102A or elsewhere.

As discussed above, the server 102 may receive content units for storage in the database 102A from multiple different sources 104, and these content units may be in multiple different formats and may include structured data and/or unstructured data. When received by the server 102, the database engine (or some other component) may semantically interpret the content units and store annotations for the content units in the database 102A.

Once annotations for content units are stored in the database 102A, queries may be made of the database 102A that make use of the annotations to identify content units and retrieve information regarding the content units, such as the content units themselves. Queries of the database 102A may be made in any suitable manner, as embodiments are not limited in this respect. Queries may be received from any suitable source, including from a device 108 operated by a user (e.g., a human user or a non-human user such as a software program executing on the device 108). In some embodiments, the queries may be received from users according to a structured format that requires users to submit the queries according to a particular structure and/or phrasing selected to match or work with the annotations stored for the content units. In other embodiments, as discussed above, users may be permitted to submit queries in any suitable format or any suitable phrasing, such as through using natural language queries.

As discussed in greater detail below, when the database engine of the server 102 receives a natural language query, the natural language query may be processed to determine a structured query by which to search the database 102A. The processing may be carried out in any suitable manner, as embodiments are not limited in this respect. In some embodiments, the processing of the natural language query may include semantically interpreting the query to determine one or more annotations from the query. Once annotations are determined from the query, the annotations may be used to form a structured query and the database may then be queried according to the structured query. Techniques for semantically interpreting queries are described in greater detail below. In brief, in some embodiments that semantically interpret queries, the same semantic interpretation engine may be used as was used to determine annotations for content units stored in the database 102A. When the same semantic interpretation engine is used, the same executable instructions executing on the same hardware (e.g., one or more processors) may be used to determine annotations from both one or more content units and one or more queries. In other such embodiments, a different semantic interpretation engine (e.g., different hardware executing the same executable instructions, or different executable instructions executed on the same or different hardware) may be used, but the semantic interpretation engine may use the same annotation model as was used in semantically interpreting content units. By using the same annotation model, the types of annotations that are determined from the query may be the same as the annotations determined from the content units and those annotations may be formatted in the same way. A search of the database can then be performed by matching annotations.

It should be appreciated that embodiments are not limited to implementing any of the devices of the system 100 in any particular manner. Each of server 102, server 104A, client device 104D, and client device 108 may be implemented as any suitable computing device or array of more than one computing device, including servers and personal computing devices. Databases 104B and 104C may be managed by any suitable computing devices as well. Further, it should be appreciated that, in some embodiments, the database 102A may receive content units for storage from the same device that is operating the database 102A, and/or may receive queries from the same device that is operating the database 102A. Embodiments are not limited to use in systems including multiple different computing devices that serve as sources of content units and sources of queries, as the techniques described herein can be used to store content units and/or queried from a single source.

It should also be appreciated that embodiments are not limited to organizing or formatting the database 102A in any particular manner. Embodiments may operate the database using any suitable organization.

Figure 2:
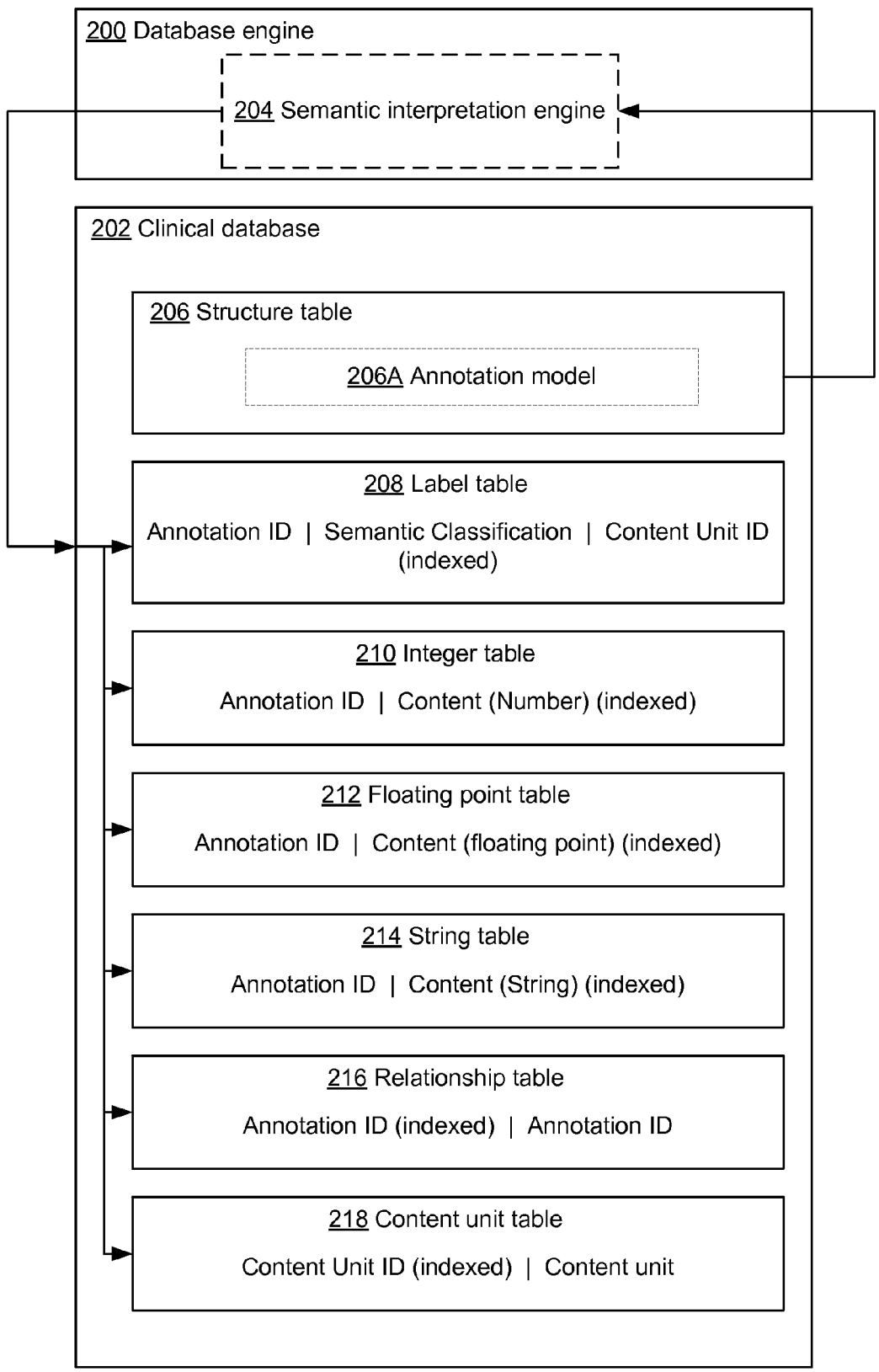
FIG. 2 is a block diagram of an illustrative organization of a database that may be used in some embodiments.

FIG. 2 illustrates one example of a way in which a clinical database (i.e., a database storing clinical (including healthcare) data) operated according to techniques described herein may be organized. The clinical database 202 of FIG. 2 stores content units and annotations regarding those content units, where the content units and annotations may relate to clinical information. The annotations regarding a content unit may include annotations determined from an analysis of the content unit, including content units produced as a result of a semantic interpretation of the content unit. As discussed above, content units to be stored in the database 202 may be processed by a database engine 200, which may semantically interpret the content units to create annotations for the content units. The database engine 200 of FIG. 2 may communicate with a semantic interpretation engine 204 to semantically interpret content units and create annotations based on the semantic interpretation. The semantic interpretation engine 204 may form a part of the database engine 200 or may be implemented separately from the database engine 200, as embodiments are not limited in this respect.

The clinical database 202 organizes data stored by the database using multiple tables. Each table includes one or more fields to store data in the table, where each field stores a particular type of data. Types of data that a field may store include number data (e.g., an integer or a floating point number), text, binary data (e.g., audio data, image data, executable instructions, etc.), or any other type of data. The organization of a table, and the fields of the table, may be represented as a data structure stored on a hard disk or any other computer readable storage medium on which data of the database may be stored. Any suitable data structure may be used for storing a table on a storage medium, as embodiments are not limited in this respect.

A table may be stored as a single data structure representing the organization and the fields of the table or may be stored as multiple data structures. In some embodiments in which a table is stored in multiple data structures, the table may be stored as two or more data structures having the same organization and including information identifying the same fields of the table. In some embodiments in which a table is stored on disk using multiple different data structures, the multiple data structures for the table may be stored on one or more storage media in the same manner as data structures for two separate tables may be stored. In some such embodiments, the separate data structures for the single table may be linked or otherwise associated to form one logical table.

A data structure representing the table may, in some embodiments, also store the data stored in the table. The database may store data in the table in different rows of the table, which may be represented in the data structure in any suitable manner.

FIG. 2 illustrates a non-limiting, illustrative clinical database 202 with tables that may be used to store content units and annotations regarding the content units, as well as a table that may store information that may be used in the creation of annotations.

The database 202 includes a structure table 206 identifying a format of annotations, tables 208-216 for storing annotations, and a content unit table 218 for storing content units. In some embodiments, the structure table 206 stores information on an annotation model 206A, which may be used by the semantic interpretation engine 204 in creating annotations by semantically interpreting content units. Any suitable information that the semantic interpretation engine 204 may use in creating annotations, including the annotation model itself, may be stored in the structure table 206. The information on the annotation model 206A may include information identifying a format of each type of annotation that the semantic interpretation engine 204 may create. When the semantic interpretation engine 204 interprets a content unit, the semantic interpretation engine may create one or more annotations. When multiple annotations are created for a content unit, the annotation may be of multiple different types, each of which may have a different meaning and different content, and each of which may have the same or a different format. In embodiments in which different formats are used for different types of annotations, the structure tables 206 may identify how each type of annotation is to be formatted for storage in the database 202, such that annotations of the same type are arranged in a consistent format in the database 202. The structure table 206 may identify, for example, a label for the semantic classification of a type of annotation, such that all annotations of the same semantic classification use the same label. The structure table 206 may also identify content that is to be included in an annotation and the type(s) of data to be included in the annotation content, such as what text is to be included in the annotation content and in what order or organization the text is to be stored in the annotation.

The structure table 206 may store any suitable information as a label indicating a semantic classification, as any suitable information may be used as a label. Embodiments are not limited to using any particular label or type of label to indicate a semantic classification of an annotation. For example, in some embodiments, a label indicating a semantic classification may be an alphabetic, numeric, or alphanumeric string of characters. In some embodiments in which the label is an alphanumeric string of characters, the label indicating a semantic classification may be a word that, in a human language, has a meaning that relates to the semantic classification. For example, for a type of annotation that is related to a medical diagnosis, the label for the semantic classification may be the English word "Diagnosis." In such embodiments, the English word "Diagnosis" may be used as the label indicating the semantic classification of the content of the annotation even in cases in which the content of the annotation is not in the English language. In other embodiments in which a string of characters is used as a label for a semantic classification, the string of characters may not have a meaning or may not have a meaning that relates to the semantic classification. For example, in some embodiments that operate with a type of annotation that is related to a medical diagnosis, the label for the semantic classification may be the unrelated English word "banana" or a set of alphanumeric characters without meaning, such as "12345," "abc123," "abcxyz," or any other suitable string. In some embodiments, all annotations having the same semantic classification and produced by a semantic interpretation engine according to the same annotation model may include the same label.

As discussed above, in some embodiments, a semantic interpretation engine 204 may be configured to generate both structural and semantic annotations for content units. An example of a structural annotation is one that identifies words appearing in the text of a content unit, and an example of a semantic annotation is one that identifies clinical symptoms expressed in the text of a content unit. For embodiments that employ such annotation types, the structure table 206 may include information identifying a format of the structural annotation relating to words and a format of the semantic annotation related to clinical symptoms. For example, the structure table 206 may identify that the structural annotation identifying a word of a text document is to be formatted in a structure having four fields. The four fields may include (1) a field storing an identifier identifying the annotation (e.g., using alphanumeric characters, such as randomly- or pseudorandomly-generated alphanumeric characters) in a manner that may be unique (including probabilistically unique for the environment); (2) a field storing a label for the semantic classification of the annotation (which may be the text "Token"); (3) a field storing the text of the word to which the annotation relates, and (4) a field storing an identifier (which may be alphanumeric characters as discussed in connection with the first field) for the content unit in which the word appears and from which the annotation was created and/or to which the annotation relates. The structure table 206 may identify, for a semantic annotation such as a symptom annotation, that the annotation is to be formatted in a structure having five fields. The five fields may include (1) a field storing an identifier for the annotation (e.g., using alphanumeric characters, such as randomly- or pseudorandomly-generated alphanumeric characters) in a manner that may be unique (including probabilistically unique for the environment); (2) a field storing a label for the semantic classification of the annotation (which may be the text "Symptom"); (3) a field storing the text of the symptom extracted from the text of the content unit (e.g., "pyrexia," when the content unit indicates that the patient to which the content unit relates is experiencing a fever); (4) a field storing one or more identifiers for one or more other annotations relating to the word or phrase that the semantic interpretation engine 204 interpreted as identifying the symptom (e.g., identifiers for word annotations relating to the words "patient," "temperature," "39," and "degrees" that appear in the content unit and based at least in part on which the symptom annotation was determined), and (5) a field storing an identifier (which may be alphanumeric characters as discussed in connection with the first field) for the content unit from which the annotation was created and/or to which the annotation relates. It should be appreciated, however, that the number and types of fields for the exemplary types of annotations described above are merely illustrative, as embodiments are not limited in this respect. Embodiments may include any suitable content for any suitable annotations. Embodiments that include structural annotations relating to words and semantic annotations relating to symptoms may include any suitable content organized as any suitable number and types of fields, as embodiments are not limited in this respect.

In some embodiments the semantic interpretation engine 204 may, as part of semantically interpreting a content unit, review the information stored in the structure table 206 and produce one or more annotations having formats corresponding to formats identified by the structure table 206. The semantic interpretation engine may produce the annotations in any suitable format, one non-limiting example of which is an Extensible Markup Language (XML) document identifying each of the annotations and including the contents of the annotations arranged according to the formats for the annotations. Once the annotations are created by the semantic interpretation engine 204, the database engine 200 may store the annotations and the content units in the clinical database 202 using the other tables 208-218 of the clinical database 202.

As mentioned above, the tables 208-216 of the database 202 may be used to store annotations for content units. When annotations are stored in the database 202, each annotation may be stored in a single table, or one or more annotations may be divided and parts of the annotations may be stored in different tables. Dividing the annotations into different parts and storing the parts in different tables may enable an efficient use of indexes in the database 202 and thereby permit an efficient search and retrieval of data from the database 202. An index may be created for a field that stores a type of data, and a table may have multiple indexes. In some embodiments, all parts of an annotation may be stored in one table and all fields of that table are indexed to obtain the benefits of indexes for search. As the number of indexes on a table grows, the amount of time needed to process data for storage in the table may grow and the amount of storage space necessary to store the table may grow. Thus, in other embodiments, rather than storing all data of all annotations in the same table and indexing all fields of that table, different parts of annotations may be stored in different tables and an index may be created for each table for the fields corresponding to parts of the annotations stored in that table. Thus, in some embodiments, a database may maintain entries in one or more indices for all parts of all annotations determined from a content unit. The indices may correspond to multiple different tables, enabling relatively quick updating of the indices. Further, because all parts of all annotations are indexed, in these embodiments searching based on any part of any of the annotations can be performed quickly by taking advantage of the indices.

As in the example formats of annotations discussed above in connection with the structure table 206, an annotation may include a field storing a label for a semantic classification of the annotations, one or more content fields, and one or more fields identifying other annotations to which the annotation relates. When divided for storage in the database 202, the labels of annotations may be stored in a label table 208, the contents may be stored in content tables 210-214, and the relationships to other annotations may be stored in a relationship table 216.

The label table 208 of FIG. 2 may be used to store labels for semantic classifications of annotations. The label table 208 may store labels for annotations having multiple different semantic classifications. In some embodiments, the database 202 may include a single label table that stores all labels for all annotations stored by the database 202. The label table 208 may therefore, in some cases, store labels for annotations of each type of semantic classification that is supported by a semantic interpretation engine. In other embodiments, the database 202 may include multiple label tables that each stores labels for a portion of the annotations stored in the database. Labels for some annotations may be stored in one of the label tables and labels for other annotations may be stored in another of the label tables. In embodiments in which a database includes multiple label tables, the label tables may each any suitable labels. In some embodiments, a label table may store labels for one semantic classification or for multiple semantic classifications. In some embodiments, each label table may store labels for two or more semantic classifications. It should be appreciated, however, that in embodiments that use multiple label tables, labels may be divided between the label tables in any suitable manner, as embodiments are not limited in this respect. In some embodiments where multiple label tables are used, each of the multiple label tables may have the same organization, such that each of the label tables includes the same fields.

In the example of FIG. 2, the label table 208 of the database 202 includes three fields: (1) a field storing an identifier for an annotation, (2) a field storing a label for a semantic classification, and (3) a field storing an identifier for a content unit to which the annotation relates. When an annotation is stored in the label table 208, a row is created for the annotation that stores, for that annotation, the identifier for the annotation, the label for the semantic classification of the annotation, and the identifier for the content unit to which the annotation relates. The label table 208 is indexed by the database 202 according to the semantic classification field, which enables quick and efficient retrieval of information from the label table 208 when the table 208 is searched based on semantic classification.

The content tables 210-214 are three non-limiting examples of the types of content tables that may be included in a database operating according to techniques described herein. Annotations created for content units may include fields that store different types of content, e.g., text, numbers, binary data etc. In some embodiments, all content of annotations may be stored in the same table. In other embodiments, however, content of annotations may be divided between tables to permit each table to store only one or more particular type of data and to create an index for that type of data. In the embodiment of FIG. 2, tables 210-214 each store a different kind of content for annotations and are indexed on that kind of content. The integer table 210 includes a field for an identifier for an annotation and a field for an integer number, and is indexed by the field storing the integer number. When an annotation is stored in the database 202 and content of the annotation includes an integer number, a row is created in the table 210 and the identifier for the annotation and the integer number are stored in the fields of the table 210 in that row. A floating point table 212 is similarly arranged for storing floating point numbers included in content of annotations, and a string table 214 is similarly arranged for storing strings (i.e., text) included in content of annotations.

The clinical database 202 further includes a relationship table 216 that stores pairs of annotation identifiers and identifies, through the pairs, annotations that are related to one another. Relations between annotations may be created in any suitable manner and for any suitable reason. In the symptom annotation described above, the symptom annotation included a field identifying a word annotation for word(s) from which the symptom was determined when a content unit was semantically interpreted. As another example, a sentence annotation may identify a relationship among word annotations for words included in the sentence to which the sentence annotation relates, and a section annotation identifying an organizational section of a text document may identify a relationship with each of the structural and/or semantic annotations determined from text included in that section of the document. When annotations to be stored in the database 202 are identified as related, the relationship between the annotations may be stored in the relationship table 216 such that the relationship may be retrieved later, e.g., during querying of the database 202 based on the annotations.

FIG. 2 also illustrates the database 202 as including a content unit table 218. The content unit table 218 includes two fields: (1) a field for storing an identifier for a content unit and (2) a field for storing the content unit itself, and is indexed on the first of these fields. When the content unit itself is stored, a subsequent search of the database 202 may include a query of content of the content unit, as an alternative to or in addition to a query of annotations regarding the content unit, and the content unit can be retrieved and provided to a user in response to a query.

It should be appreciated that embodiments are not limited to operating a clinical database including the organization illustrated in the example of FIG. 2. Rather, embodiments may operate with a database having any suitable organization, including any suitable arrangement of tables and fields for storing annotations and/or content units in a database.

Further, it should be appreciated that embodiments are not limited to executing any particular technique for operating a database and that embodiments may carry out any suitable processes for evaluating content units for storage (including semantically interpreting content units to determine annotations for the content units), storing annotations and/or content units, and querying a database of annotations and/or content units. Examples of techniques for operating databases are described below in connection with FIGS. 3-10.

Figure 3:
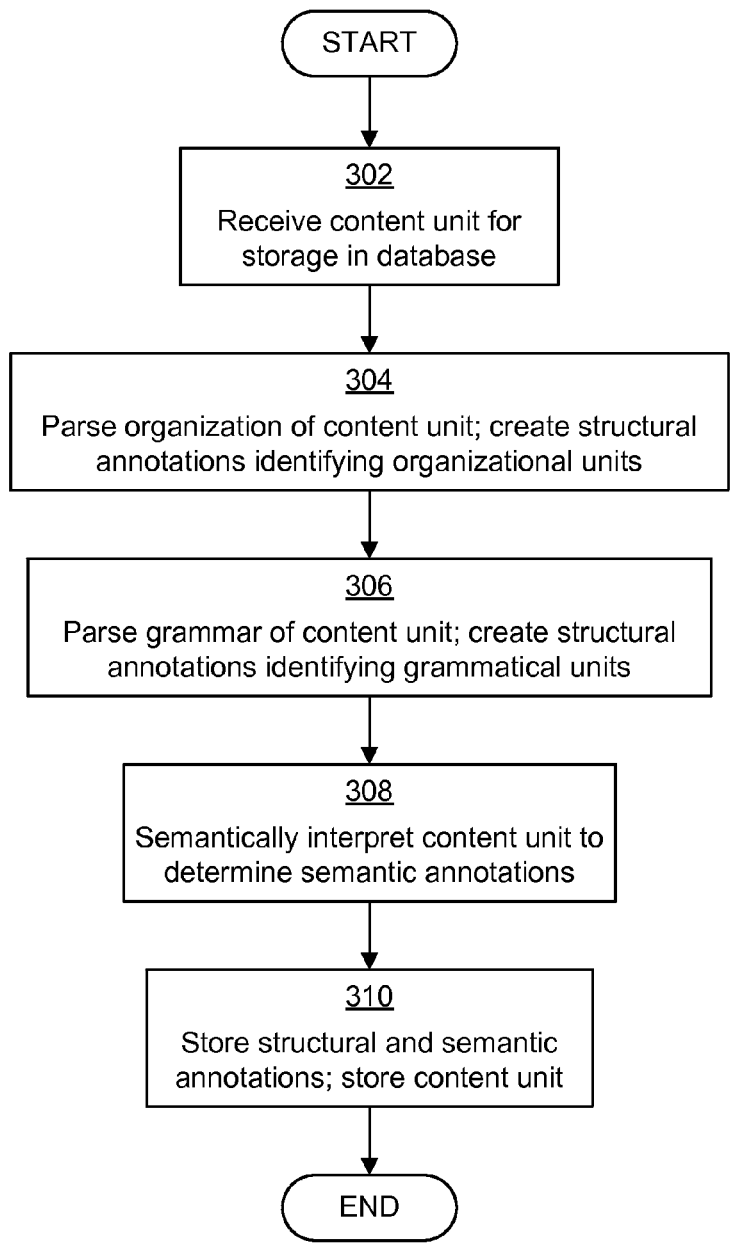
FIG. 3 is a flowchart of an illustrative process for storing content units in a database in accordance with some embodiments.

FIG. 3 illustrates one exemplary process that a database engine may carry out for evaluating content units for storage in a database. Prior to the start of the process 300 of FIG. 3, the organization of a database, including the tables and fields of the database, is identified and the database is created. In addition, an annotation model is created that defines a format of annotations that may be determined from a semantic interpretation of content units to be stored in the database. The annotation model may be stored in the database and/or stored elsewhere accessible to a semantic interpretation engine that will semantically interpret content units for storage in the database. In some cases, other content units may have been semantically interpreted and annotations for the content units and/or the other content units themselves may have been stored in the database prior to the start of the process 300.

The process 300 begins in block 302, in which the database engine receives a content unit for storage in the database. In the example of FIG. 3, the content unit received by the database engine may be a text document, which may include structured and/or unstructured text. Upon receiving the content unit for storage in the database, the database engine begins evaluating the content unit for storage. As part of evaluating the content unit for storage, the database engine may trigger a semantic interpretation engine to carry out a semantic interpretation of the content unit. In some embodiments, the semantic interpretation engine may form a part of the database engine. In other embodiments, the semantic interpretation engine may be implemented separate from the database engine and the database engine may communicate with the semantic interpretation engine regarding the content unit and results of the semantic interpretation of the content unit. Regardless of how the semantic interpretation engine is implemented, the database engine may communicate with the semantic interpretation engine and request that the semantic interpretation engine interpret the content unit received in act 302.

The semantic interpretation of the content unit may be carried out using any suitable semantic interpretation technique, as embodiments are not limited in this respect. For example, some embodiments may implement a semantic interpretation process like the one described in U.S. Pat. No. 7,493,253, titled "Conceptual world representation natural language understanding system and method" and dated Feb. 17, 2009 (the '253 patent). As another example, some embodiments may implement a semantic interpretation process like the one described in "A Statistical Model for Multilingual Entity Detection and Tracking" by R. Florian et al., published in the proceedings of the 2004 Human Language Technologies and North American Association for Computational Linguistics Conference ("the Florian article). It should be appreciated, however, that the aspects of the present invention that relate to employing a semantic interpreter are not limited to employing one implemented in either of these manners, as any suitable semantic interpretation process may be used.

Semantic interpretation of a content unit by the semantic interpretation engine may be considered to be carried out in three phases. Each of the three phases may semantically interpret the content unit in different ways, with some phrases considering a structure of the content unit and one or more other phrases considering meanings expressed by content of the content unit. Semantic interpretation of the content unit (e.g., a document) begins in block 304 of FIG. 3, in which the semantic interpretation engine determines one or more organizational units of the content unit through parsing the organization of the content unit. Content units may be organized in various different ways, and the semantic interpretation engine may not be limited to identifying any particular organizational unit or units of content units. Rather, the semantic interpretation engine may be configured to identify any organization of a content unit. The semantic interpretation engine may identify the organization of the content unit from an explicitly-identified structure of the content unit, such as table of contents data for a content unit that is a document or formatting information embedded in a content unit. Additionally or alternatively, the semantic interpretation engine may identify the organization of a content unit from reviewing, in cases in which the content unit is a document, the text of the document and/or font style information in the document to identify, for example, section headings included in the document. Any suitable process for identifying organizational units of a content unit may be used in block 304.

Identifying organizational units of the content unit may be useful in servicing some queries of the database once the content unit is stored in the database. For example, a document describing a clinical encounter between a clinician and a patient may include a "symptoms" section identifying symptoms exhibited by the patient. Queries of the database may later request information regarding symptoms exhibited by patients (e.g., a natural language query requesting all documents where "symptoms include nausea"). Identifying that the document includes a symptoms section and subsequently identifying content included within the symptoms section may result in indexing the document in ways that facilitates searching that would not be possible otherwise. For example, by identifying that the concept "nausea" appears in a document, that the document includes a symptoms section, and that the concept appears in the symptom section, the database can store the document in a way that relates the content unit to the concept expressed by the document. Storing content units in this way may enable queries to be processed in ways that conventional databases do not support.

Once the semantic interpretation engine identifies organizational units of the content unit (e.g., sections and, in some cases, subsections of a document), annotations may be determined for each of these organizational units. The format of all annotations, including the annotations for organizational units, may be defined by an annotation model used by the semantic interpretation engine. The annotation model may identify a semantic classification for each type of annotation and a label for that semantic classification, such as the label "Section" for an organizational unit that represents a section of a text document. Accordingly, when the semantic interpretation engine creates an annotation corresponding to an organizational unit, the semantic interpretation engine may consult the annotation model to determine a format of the annotation to be created and a label to be included in the annotation.

In block 306, the semantic interpretation engine also parses the content unit. For example, when parsing a document, the semantic interpretation engine may use a grammar for the language in which the document is written. The grammar for the language may identify grammatical units of the language, such as words, phrases, sentences, paragraphs, punctuation marks, etc. The semantic interpretation engine may create annotations corresponding to each of the grammatical units included in the document and may create annotations according to a hierarchy of grammatical units included in the document. The hierarchy of grammatical units may identify a relationship between grammatical units of the language, and may identify which grammatical units are included within other grammatical units. The hierarchy, therefore, may be useful in identifying relationships among annotations for grammatical units. For example, where the content unit is a document, the semantic interpretation engine may create annotations corresponding to each of the words and punctuation marks within a document. The semantic interpretation engine may identify annotations related to phrases included in the document and/or sentences included in the document. The annotations related to phrases and/or sentences may be related to one or more annotations that are related to words and/or punctuation marks of the document. For example, a sentence annotation may relate to multiple word annotations and punctuation mark annotations for the words and punctuation marks of that sentence. Similarly, a paragraph annotation may be created that relates to one or more sentence annotations for sentences included in a paragraph. Accordingly, annotations for some grammatical units may identify relationships to other annotations for other grammatical units determined from the semantic interpretation of the document, and the annotations may identify a hierarchy of grammatical units. In addition, in some cases, an annotation for a grammatical unit may identify another organizational annotation corresponding to an organizational unit to which the grammatical unit relates. For example, a word annotation may identify an annotation for an organizational unit corresponding to a section of the document in which the word appears.

As with annotations relating to organizational units, an annotation model that is used by the semantic interpretation engine may identify formats for annotations related to grammatical units, and may identify a label for the semantic classification of each annotation type (e.g., "Word," "Token," "Sentence," etc.). Accordingly, when the semantic interpretation engine creates an annotation corresponding to a grammatical unit, the semantic interpretation engine may consult the annotation model to determine a format of the annotation to be created and a label to be included in the annotation.

In blocks 304 and 306, the semantic interpretation engine creates annotations for the explicit content of the content unit (e.g., the words of a text document). In some embodiments, the semantic interpretation engine is not limited to identifying the explicit content of the content unit, and may also create annotations for implicit content of the content unit. To do determine the annotations for the implicit content of the content unit, the semantic interpretation engine may interpret or analyze the explicit content of the content unit to determine information implied by the explicit content. The semantic interpretation engine, according to an ontology for the language and/or domain(s) to which the content unit relates and determine from the interpretation one or more meanings expressed by the explicit content of the content unit. The semantic interpretation engine may then create annotations corresponding to these meanings.

Techniques to perform semantic interpretation to identify one or more meanings of content are known in the art, as described in detail, for example, in the '253 patent and the Florian article referenced above. A detailed discussion of semantic interpretation to identify meanings of content units is therefore not necessary herein. In short, according to one illustrative approach, an ontology for a language or domain identifies words or phrases used in the language or domain that express a concept. In some cases, multiple words or phrases may correspond to the same content. For example, in the clinical domain, the words/phrases "vomit," "throw up," "puke," and "emesis" (as well as variations such as "vomiting") may each relate the same concept, "vomiting." When words/phrases that are mapped by an ontology to a concept appear in a document, the semantic interpretation engine may evaluate the words/phrases and the context in which the words/phrases appear and determine whether the words/phrases express that concept.

In block 308, the semantic interpretation engine semantically interprets the content unit (e.g., a document) based on one or more ontologies, each of which corresponds to the language of the content unit and/or a domain to which the content unit relates. In some cases, a content unit may relate to multiple domains, and the semantic interpretation engine may interpret the content unit according to an ontology for each of the domains, as different ontologies may identify different meanings for different words/phrases included in a content unit. For example, a semantic interpretation using an ontology for a financial domain may map the word "bank" to a concept relating to a financial institution, while a semantic interpretation using an ontology for a topographic domain may map the word "bank" to a concept relating to rivers or the edges of rivers (i.e., riverbanks). Thus, when the word "bank" is used in a document and a semantic interpretation engine uses these ontologies, the semantic interpretation engine may identify one or the other concept expressed in the document, based on the context in which the concept appears. In some embodiments, the semantic interpretation engine may interpret a content unit using a single ontology that is specific to a domain, using multiple domain-specific ontologies, or using a domain-specific ontology as well as a generic ontology for the language of the content unit, or any other suitable combination of one or more ontologies. Embodiments are not limited to semantically interpreting content units using any particular ontology, type of ontology, or combination of types of ontologies.

In block 308, the semantic interpretation engine, upon identifying concepts expressed in the content unit, may create annotations for the concepts expressed in the content unit. The semantic annotations may be created and specified in any suitable manner. In one embodiment, the semantic interpretation engine may use an ontology and an annotation model to determine annotations for a content unit. Concepts included in the ontology may each correspond to a type of annotation specified by the annotation model. The annotation model may specify a semantic classification for concepts included in the ontology and a label for each semantic classification. The annotation model may also specify content to be included in an annotation that corresponds to a concept included in the ontology and a format of the annotation. Thus, by interpreting the content unit using the ontology and the annotation model, the semantic interpretation engine may determine concepts expressed by the content unit and annotations for the concepts.

As one example of the process of creating a semantic annotation in the clinical domain, an annotation may be created that is a symptom annotation related to the concept of "pyrexia," which is the clinical term for a fever. A clinical ontology may map the phrase "fever" to the concept "pyrexia." When the semantic interpretation engine reviews a document and identifies a temperature of 39 degrees Celsius in the document and this temperature is related to a patient (e.g., it is a patient's temperature, rather than a temperature of an environment), based on the ontology and the context in which the phrase appears, the semantic interpretation engine may identify that the document expresses the concept "fever," as the patient's temperature is above the 37.5-degree-Celsius cutoff for fever. The annotation model may identify that the concept "fever" is related to an annotation type having the semantic classification of "symptom." Based on the structure of the symptom annotation identified by the annotation model, the semantic interpretation engine may create an annotation having: (1) a field for a label for the semantic classification that stores the text "Symptom," (2) a field for a content of the annotation that stores the text "Pyrexia" or "Fever," (3) one or more fields storing identifiers for the content unit to which the annotation relates; and (4) identifiers for word annotations (e.g., for the words "patient," "temperature," "39" and "degrees") from which the concept was identified.

As a result of the semantic interpretation of the content unit, the semantic interpretation engine creates annotations relating to organizational units of the content unit, grammatical units of the content unit, and concepts expressed in the content unit. The annotations may be formatted in any suitable manner. In some embodiments, the annotations produced by the semantic interpretation engine may be formatted as an Extensible Markup Language (XML) document. The XML document may include each of the annotations as one or more nodes of the XML document, where each node includes the annotation or a part of the annotation. In one embodiment, the XML document may have an organization corresponding to that of the content unit from which the annotations were extracted, but not all embodiments are limited in this respect. For example, annotations may be included in the XML document in a hierarchy identifying relationships between the annotations determined from the content unit and corresponding to content of the content unit to which the annotations relate. For example, nodes of the XML document for organizational annotations that correspond to sections of the content unit may appear in the XML document in the same order that the sections appear in the content unit. Some nodes for an organizational annotation may include, within the node, other nodes for grammatical annotations and semantic annotations determined from that section of the content unit. For example, a paragraph annotation for a paragraph appearing within a section of a document may be represented in the XML document as a node within a node corresponding to the organizational annotation for the section. Other nodes within the node corresponding to the paragraph annotation may correspond to sentence annotations, and those nodes for sentence annotations may in turn include token annotations for words and punctuation marks included in the sentences. Semantic annotations may also be included in the nodes of the XML document, such as stored in the XML document within a node for an organizational unit (e.g., section) within which the concept for the annotation appears or within a node for a grammatical unit (e.g., a sentence) within which the concept for the annotation appears.

An example of the type of XML document that a semantic interpretation engine may produce in some embodiments will now be described for a semantic interpretation carried out on the text "My cat is brown." From the semantic interpretation, a number of annotations may be determined. Grammatical annotations may be determined for each of the grammatical units of the text, including a sentence annotation for the sentence and token annotations for each of the words and the punctuation mark for the text. Additionally, semantic annotations for concepts expressed in the text may be identified. The annotations may include:

Token1: "My"
Token2: "cat"
Token3: "is"
Token4: "brown"
Token5: "."
Sentence 1: Token1-Token5
Concept1: Animal=Cat
Concept2: Color=Brown
Parse1: Dependency=Token4 and Token2
Parse2: Dependency=Token2 and Token1
Fact1: "Brown cat"
Fact2: "The 'brown cat' belongs to 'me.'"

Each of these annotations identifies something about the text. The token annotations identify the basic constituent parts of the text that was interpreted, and the sentence annotation identifies a relationship among those five token annotations. The dependency annotations identify semantic relationships between the words of the text, such as that the word "cat" is semantically related to the word "my" and the word "brown" is semantically related to the word "cat," because the words "my" and "brown" both modify the word "cat" in the text. From the words and the identified dependencies, various concepts can be determined from the text. For example, the semantic interpretation engine can determine from the words that the text discusses a type of animal that is "cat" and that the text discusses a type of color that is "brown." From the dependency annotations the semantic interpretation engine can determine that the text expresses a fact that there is a "brown cat" and expresses a fact that "the 'brown cat' belongs to 'me.'"

The semantic interpretation engine may arrange these facts according to a structure identified by an annotation model and may produce an XML document including those annotations. An example of such an XML document is:

```
<Text>
    <Sentence id=1>
        <Token id=1>My</Token>
        <Token id=2>cat</token>
        <Token id=3>is</token>
        <Token id=4>brown</token>
        <Token id=5>.</token>
        <Concept id=1 type=Animal>
            <content>cat</content>
            <annotations><token id=2></annotations>
        </Concept>
        <Concept id=2 type=Color>
            <content>brown</content>
            <annotations><token id=4></annotations>
        </Concept>
        <Parse id=1 type=Dependency>
            <annotations>
                <token id=2>
                <token id=1>
            </annotations>
        </Parse>
        <Parse id=2 type=Dependency>
            <annotations>
                <token id=4>
                <token id=2>
            </annotations>
        </Parse>
        <Fact id=1>
            <content>brown cat</content>
        </Fact>
        <Fact id=2>
            <content> The 'brown cat' belongs to 'me.'</content>
        </Fact>
    </Sentence>
</Text>
```

The XML document created by the semantic interpretation engine therefore includes the content of annotations determined from text and identifies a relationship between the annotations. The relationship between the annotations can be determined from the organization of the XML document. For example, the nodes for the token annotations are stored within the node for the sentence annotation, which identifies that there is a relationship between the token annotations and the sentence annotation. When the XML document is reviewed as part of storing annotations in the database, this relationship between the hierarchical nodes results in annotations stored in the database that correspond to nodes of the hierarchy including identifiers for other annotations that correspond to other nodes of the hierarchy. The inclusion in annotations of identifiers for other annotations indicates a relationship between annotations that may be stored by the database and used by the database as discussed below.

While some embodiments may produce an XML document based on annotations determined from a semantic interpretation of a content unit, it should be appreciated that all embodiments are not limited to producing an XML document or producing an output regarding the annotations in any particular manner, as embodiments may produce an output regarding annotations in any suitable manner.

Once the semantic interpretation is carried out in blocks 304-308 and annotations have been determined for the content unit received in block 302, in block 310 the database engine may receive the annotations (e.g., by receiving an XML document containing the annotations) from the semantic interpretation engine and store the annotations in the database. The database engine may store in the database both structural annotations relating to organizational and/or grammatical units of the content unit and semantic annotations relating to concepts expressed in the content unit. In addition, in block 310 the database engine may store the content unit received in block 302 that was semantically interpreted to produce the annotations. The annotations and content unit may be stored in any suitable manner, examples of which are described below in connection with FIG. 4. In some embodiments, the XML document may also be stored in the database.

Once the annotations and content unit are stored in the database in block 310, the process 300 ends. As a result of the process 300, the annotations and content unit are stored in the database. The database engine may thereafter, e.g., via a query engine described in greater detail below, search the annotations in response to a query from a user and retrieve the content unit along with other information stored in the database. The database engine may receive other content units to be stored in the database and repeat the process 300 for each newly-received content unit.

Figure 4:
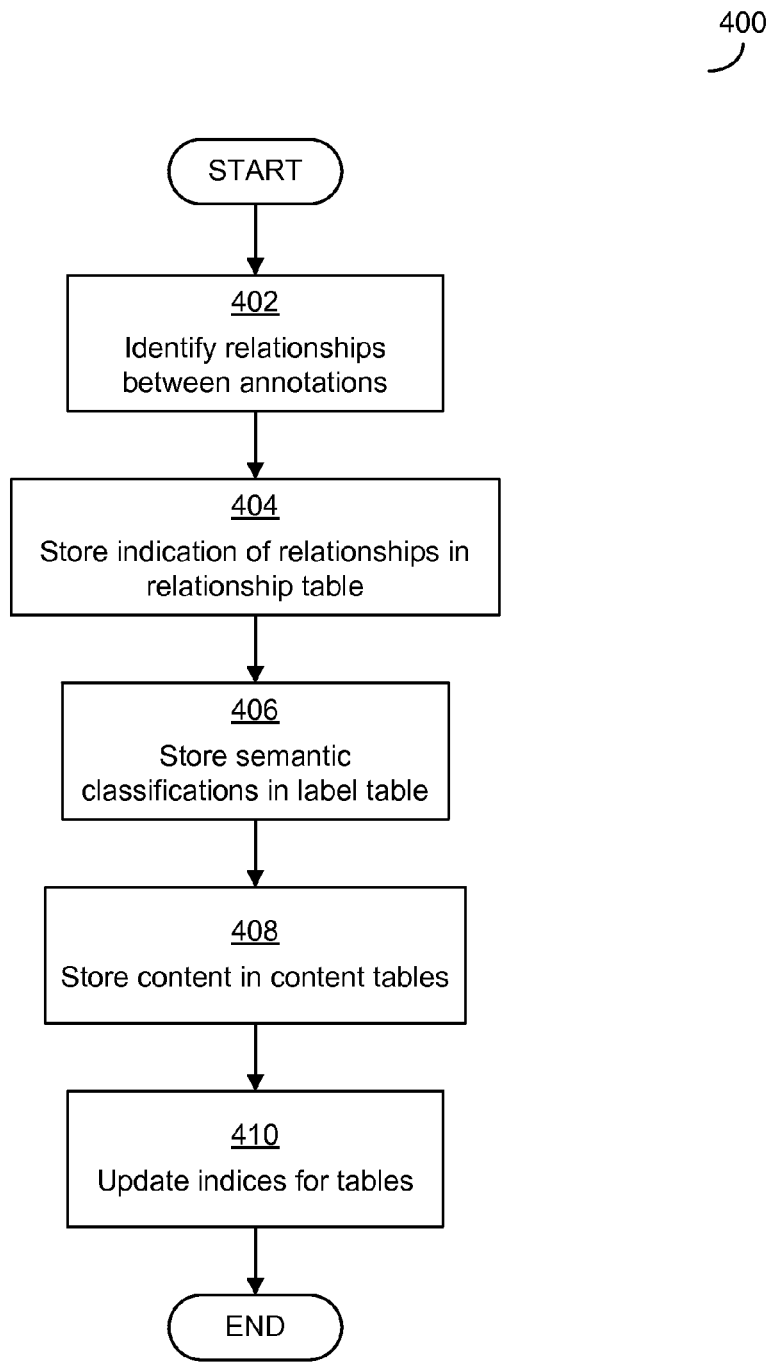
FIG. 4 is a flowchart of an illustrative process for storing annotations in a database according to semantic classifications that may be used in accordance with some embodiments.

As mentioned above, all embodiments are not limited to storing content units and annotations in a database in the manners described herein, as the database may be organized in any suitable manner, and information may be stored in the database in any suitable manner. FIG. 4 illustrates one process that may be carried out by a database engine for storing annotations in a database, but it should be appreciated that all embodiments are not limited to carrying out the exemplary process of FIG. 4. The process 400 described below stores data in the database organized according to the illustrative organization of FIG. 2, but it should be appreciated that all embodiments are not limited to storing information according to this illustrative organization.

Prior to the start of the process 400 of FIG. 4, a semantic interpretation engine semantically interprets a content unit to be stored in a database to determine one or more annotations regarding the content unit. The annotations determined for the content unit may include structural and/or semantic annotations for the content unit. The annotations determined from the content unit and received by a database engine may be formatted as an XML document or in any other suitable manner.

The process 400 begins in block 402, in which a database engine analyzes annotations created as an output of the semantic interpretation process to identify relationships between the annotations. The relationships between the annotations may identify any suitable information about the annotations (e.g., that a pair of annotations were extracted from related positions in a content unit, that the annotations are semantically associated, such as may be the case with grammatical annotations that relate to one another or any other suitable information). Relationships between annotations may be determined from a manner in which the annotations are organized when received by database engine. For example, an organization of an XML document containing the annotations may be used to determine whether annotations are related, such as by identifying a first node of the XML document that is within a second node and determining, therefore, that annotations corresponding to the first and second nodes are related. As another example, relationships between annotations may be determined from the content of the annotations themselves, such as when an annotation includes a field identifying related annotations.

In block 404, the database engine stores, in a relationship table of the database, indications of relationships between annotations determined from the analysis of block 402. Identifiers for related annotations may be stored together in the relationship table. For example, for each pair of identifiers, the database engine may create a new row in the relationship table. The annotations identifiers that are stored in the relationship table may be unique identifiers for annotations in the database. For example, strings of alphanumeric characters of sufficient length to be actually or probabilistically unique in the database may be assigned to annotations and used as annotation identifiers.

In block 406, the database engine reviews the annotations to determine semantic classifications for each of the annotations to be stored in the database. The database engine may identify, from the annotations, labels included in and stored as a part of the annotations. These labels may identify semantic classifications of the annotations. For example, a label may identify that an annotation represents a concept expressed in a content unit or a grammatical unit appearing in a content unit. Upon determining semantic classifications for the annotations, the database engine stores each of the semantic classifications in a label table of the database.

In some embodiments, all of the labels for the annotations may be stored together, in the same table of the database. Thus, the table may store labels for annotations having multiple different semantic classifications. In other embodiments, the database may include two or more label tables, at least some of which store labels for multiple different types of semantic classifications. In some embodiments that store labels in multiple tables, each of the tables may have the same fields and have the same organization. In embodiments that divide labels into different tables, the labels may be divided in any suitable manner, as embodiments are not limited in this respect. For example, labels may be divided between tables by storing labels for some specified types of semantic classifications in one table and labels for other types of semantic classifications in another. As another example, labels may be divided by storing up to a certain number of labels in one table and storing other labels in another table to avoid any one table being too large. For databases that use multiple label tables, the database engine may, in block 406, determine the label table in which to store a label prior to storing a label for an annotation. To determine the label table in which to store the label for an annotation, the database engine may review information regarding an organization of the database, such as information identifying which label table stores which labels.

Regardless of whether a database uses one or more label tables, to store the labels the database engine may create a new row in the label table for each newly stored annotation. The database engine then stores in that new row the label for the semantic classification for the annotation, an identifier for the annotation, and an identifier for a content unit to which the annotation relates.

In block 408, the database engine analyzes the annotations to determine content of each of the annotations to be stored in the database. In some embodiments, content of annotations may be stored in different tables of the database based on the type of the content of the annotations. For example, as discussed above in connection with FIG. 2, a database may include a table for each type of data that may be included in content of an annotation. For example, the database may include an integer table for storing integers, a floating-point table for storing floating point numbers, a string table for storing strings of text, and/or tables storing any other type of content. An annotation may include multiple pieces of data as content of the annotation, and the multiple pieces of data may be of multiple types of data. For example, an annotation may include an integer and a string as content of the annotation. Accordingly, in block 408, database engine may identify, for each piece of data included in an annotation as content of the annotation, a type of the data. The database engine may subsequently store the piece of data in a table of the database that corresponds to that type of data (e.g., by storing a string in a string table of the database). To store a piece of data that is included in content of an annotation in the content tables, the database engine may create a new row in a content table that stores the type of data of that piece of data, and store in that new row an identifier for the annotation and the piece of data included in the content of the annotation.

It should be appreciated that when the database engine stores an entry for an annotation, (e.g., in block 404, block 406, or block 408), the same identifier is stored for all entries relating to the same annotation. By storing the same annotation identifier for all entries relating to the same annotation, a relationship may be maintained by the database between, for example, a label for the annotation stored in a label table and content of the annotation stored in one of the content tables.

In block 410, the database engine updates indices for each of the tables in which data was entered as part of storing annotations 404-408. Updating the indices for a table to account for the new data stored in the table ensures that the database engine is able to use the indices to quickly and efficiently retrieve data from the table. Indices may be updated in any suitable manner and at any suitable time, including when new data is stored in a table, immediately following the storage of new data in the table, or at some later time once a batch of operations for storing new data in the database has been completed.

Once the annotations are stored and the indices for the tables have been updated, the process 400 ends. As a result of the process 400, different parts of annotations are stored in different tables of the database and indices related to different parts of the annotations are updated, enabling query operations to be carried out on the annotations to retrieve data from the database.

Once content units and annotations for content units are stored in the database, the content units and annotations may be used in any suitable manner. To use content units and annotations stored in database, a search may be conducted of the database to determine content units and/or annotations to be used. For example, a search may be conducted to determine content units and/or annotations that are relevant to a purpose or goal of a user (e.g., a human user or a non-human user, such as a computer program or application, a computer system, etc.) and that the user may desire to retrieve from the database as part of accomplishing the purpose or goal.

A user may specify any suitable search criteria as part of a query to determine or locate one or more content units and/or annotation stored in the database. Additionally, the user may specify the query in any suitable manner, using any suitable structure or terminology, as embodiments are not limited in this respect. In some embodiments, a user may provide a structured query, such as a query according to a predefined format like the Structured Query Language (SQL), and a database engine may use the query that is received from the user to search the database. In other embodiments, a query received from a user may be processed in some way (e.g., via a database engine) to determine a search that is to be performed and the database engine may perform the search based on the processing of the user's query.

In some embodiments in which the database engine performs the search based on processing of a query received from a user, the query received from the user may be a natural language query and the database engine may perform a natural language processing on the query to identify one or more searches to be performed or the database to fulfill the intent of the query.

As discussed above, a natural language query is not limited to being structured in any particular manner, nor is a natural language query limited to using any particular terminology or phrasing. Rather, a natural language query permits a user to specify a query using any structure or phrasing desired by the user. To perform one or more a searches of a database based on a natural language query, the natural language query may be evaluated to identify one or more search criteria that can be used to search the database to retrieve information to satisfy the user's query.

In some embodiments that permit users to specify queries of the database using natural language queries, a query engine of the database engine may evaluate a natural language query using a semantic interpretation. In some such embodiments, the semantic interpretation may be carried out using the same techniques and the same annotation model that were used to perform a semantic interpretation on content units prior to storing them in the database. Through the semantic interpretation, the query engine may identify one or more annotations from the query and these annotations may be used to define a search of the database. When the database is searched using annotations determined from the query, annotations determined from the query may be compared to annotations determined from one or more content units stored in the database. When matches between annotations are found, content units corresponding to the matched annotations may be retrieved and returned as results of the search. These content units may then be presented (e.g., to the user) as results of the query.

Embodiments may process natural language queries in any suitable manner. FIGS. 5-10 illustrate examples of processes that may be used in some embodiments for performing one or more searches of a database based on a natural language query received from a user, but it should be appreciated that embodiments are not limited to implementing any of the exemplary or processes discussed in connection with FIGS. 5-10.

Figure 5:
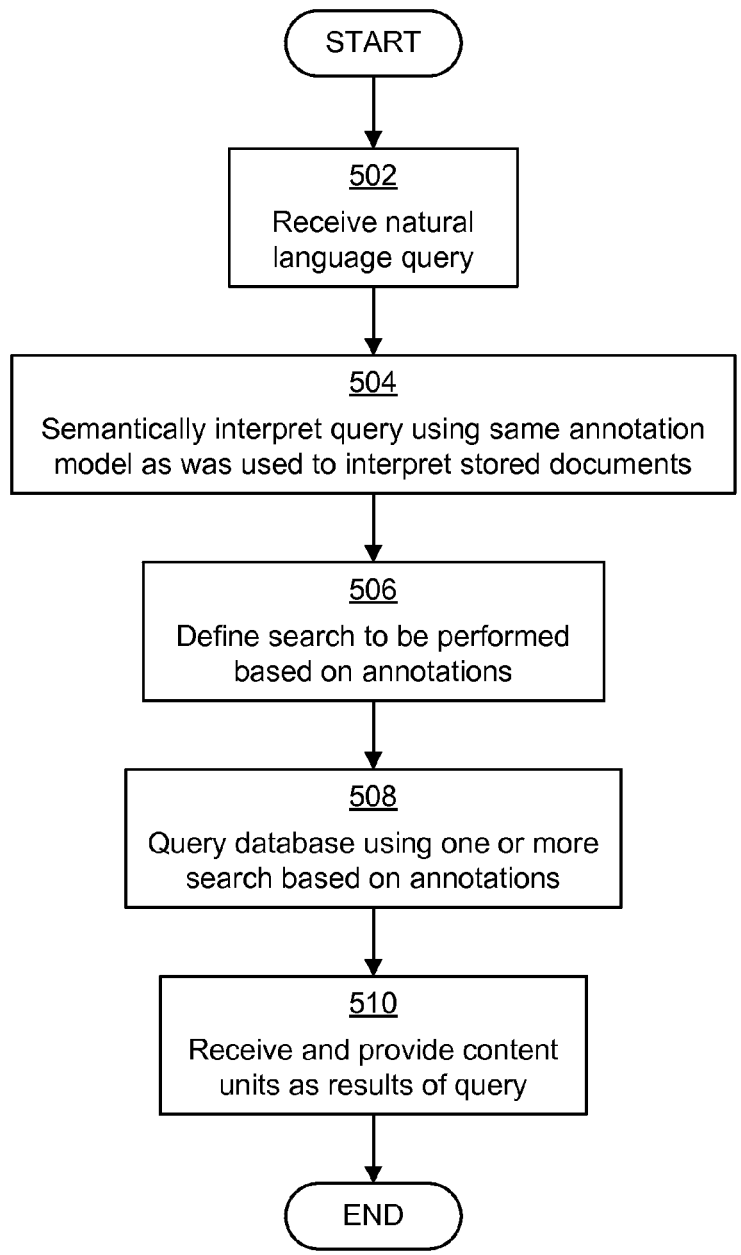
FIG. 5 is a flowchart of an illustrative process for processing a natural language database in accordance with some embodiments.

FIG. 5 illustrates one example of a process for evaluating a natural language query and searching a database based on the natural language query. Prior to the start of process 500 of FIG. 5, a database engine may store one or more content units in a database, along with annotations determined from semantic interpretation of the content unit(s). The database engine may have determined the annotations by operating a semantic interpretation engine to semantically interpret the content units according to an annotation model that defines a format of each type of annotation that the semantic interpretation engine is configured to produce.

The process 500 begins in block 502, in which a query engine of the database engine receives a natural language query from a user. The natural language query may be received from any suitable source. For example, the natural language query may have been received from a human user or a non-human user such as a software program, or computer system, and may have been received from a remote computing device via a communication network (e.g., a local network or the Internet), or may have been received from a local source on the same computing device that is executing the database engine and/or the query engine. The natural language query that is received in block 502 may include any suitable set of characters (e.g., letters, numbers, punctuation marks, etc.) to specify information that the user desires from the database.

In block 504, the query engine triggers a semantic interpretation of the natural language query to determine one or more annotations from the query. The query engine may trigger the semantic interpretation of the query in any suitable manner, such as by requesting that a semantic interpretation engine carry out the interpretation of the query. In some embodiments, the semantic interpretation engine used by the query engine may be the same semantic interpretation engine (e.g., the same executable instructions executing on the same hardware) as was operated by the database engine to interpret content units to be stored in the database. In other embodiments, the semantic interpretation engine used by the query engine may be a different semantic interpretation engine (e.g., different hardware and/or different executable instructions), but may be a semantic interpretation engine that uses an annotation model that produces annotations having the same format and/or content as the annotation model that was used by the engine that interpreted content units for storage in the database. In some embodiments in which the same and/or different semantic interpretation engine is used to process queries, the semantic interpretation engine may use the same annotation model. Accordingly, in embodiments that use the same or a different annotation model, the semantic interpretation engine that interprets the query may produce annotations having the same type and/or the same format as the annotations that are stored in the database. For example, when the semantic interpretation engine that is analyzing the query produces an annotation of a particular annotation type, the annotation produced by the semantic interpretation engine from the query would match an annotation of the same type stored in the database. Thus, when a search of the database is carried out (as discussed below), annotations determined from the query may match annotations determined from one or more content units and stored in the database.

It should be appreciated that, in some embodiments in which the same annotation model is used to interpret content units and to interpret queries, an annotation model may evolve over time. For example, new types of annotations may be added to the annotation model over time or an administrator or other entity may change a format of one of the types of annotations defined by the annotation model. Accordingly, in some embodiments in which the semantic interpretation engine that semantically interprets a query uses the same annotation model as was used to semantically interpret one or more content units, while the same annotation model is used, the version of the annotation models used at one time to interpret a query may be different from the version of annotation model used at an earlier time to interpret at least some of the content units stored in the database. However, at any given time, the annotation model used by the semantic interpretation engine to process the query may be the same model as was used by a semantic interpretation engine to process one or more content units for which annotations are stored in the database.

In cases in which the same annotation model is used and the annotation model changes over time such that new annotations are added, those new annotations may be processed by the system in different ways. In some embodiments, content units that were previously interpreted using a previous version of the annotation model may be re-processed using the new version of the annotation model. When the content units are re-processed, new annotations may be determined from the content units using the new version of the annotation model, and the new annotations may be stored in the database. In other embodiments, the content units that were previously interpreted using a previous version of the annotation model may not be reprocessed. In this case, when a search of the database is carried out using annotations for a query analyzed using the new version of the annotation model, annotations of a type that appears only in the newer version of the annotation model and that are determined from the query may not be matched to annotations determined from the content units interpreted using the older version of the annotation model. However, annotations determined from the query of types that appear in both the new version and the old version may match annotations determined from the content units interpreted using the older version.

Once the semantic interpretation of the query has been carried out, in block 506, the query engine may define one or more searches of the database to be performed based on the annotations determine from the query. The query engine may define the search(es) using any suitable structure or format, including according to a structured query such as using one or more Structured Query Language (SQL) queries that use annotations as the search parameters. The annotations may be used to define a search in any suitable manner, including based on the organization of the database and the organization of tables of the database. For example, a search may be defined in terms of searching a label table of the database for a label of a semantic classification of an annotation determined from the query and searching a content table of the database for content of the annotation determined from the query.

Any suitable annotations may be determined from the query in block 504 and may be included in the definition of a search of the database in block 506. For example, semantic annotations may be determined from the query and may be used to define the search in block 506. As another example, structural annotations such as annotations relating to organizational units of a document may be determined from a query and used to define one or more searches of the database. As an example of a structural annotation that may be determined from a query, a user may provide a natural language query that includes criteria related to a particular section of a document.

One illustrative query received from a user may request from the database clinical documents that include a "History of present illness" section and that include, within the "History of present illness" section, an indication that a patient suffered from nausea and vomiting. Such a query may be described in natural language form in any of numerous ways, one example of which is "HPI: nausea, vomiting". In such a case, an organizational annotation may be determined from the query that identifies a "History of present illness" section, and grammatical annotations may be determined for each of the three words and the punctuation mark included in the query. In addition, semantic annotations may be determined from the query, including one or more annotations for the concepts and symptoms "nausea" and "vomiting." From these annotations, one or more searches may be defined for annotations for the symptoms "nausea" and/or "vomiting" where such annotations are related to a section of a document related to history of present illness for a patient.

In block 508, once the search(es) is defined based on the annotations determined from the query, the query engine may query the database using the search(es) to identify search results. The query engine may carry out the search(es) in any suitable manner, as embodiments are not limited in this respect. Examples of ways in which one or more searches of the database may be carried out based on annotations determined from a query are described below in connection with FIG. 6.

Once the one or more searches of the database have been conducted, the query engine may receive as results of the search(es) one or more content units having annotations that matched annotations determined from the query provided by the user. The content units received as results of the search(es) may then be provided to the user that provided the query as a response to the user's query.

Once results of the query had been provided to the user, the process 500 ends.

Figure 6:
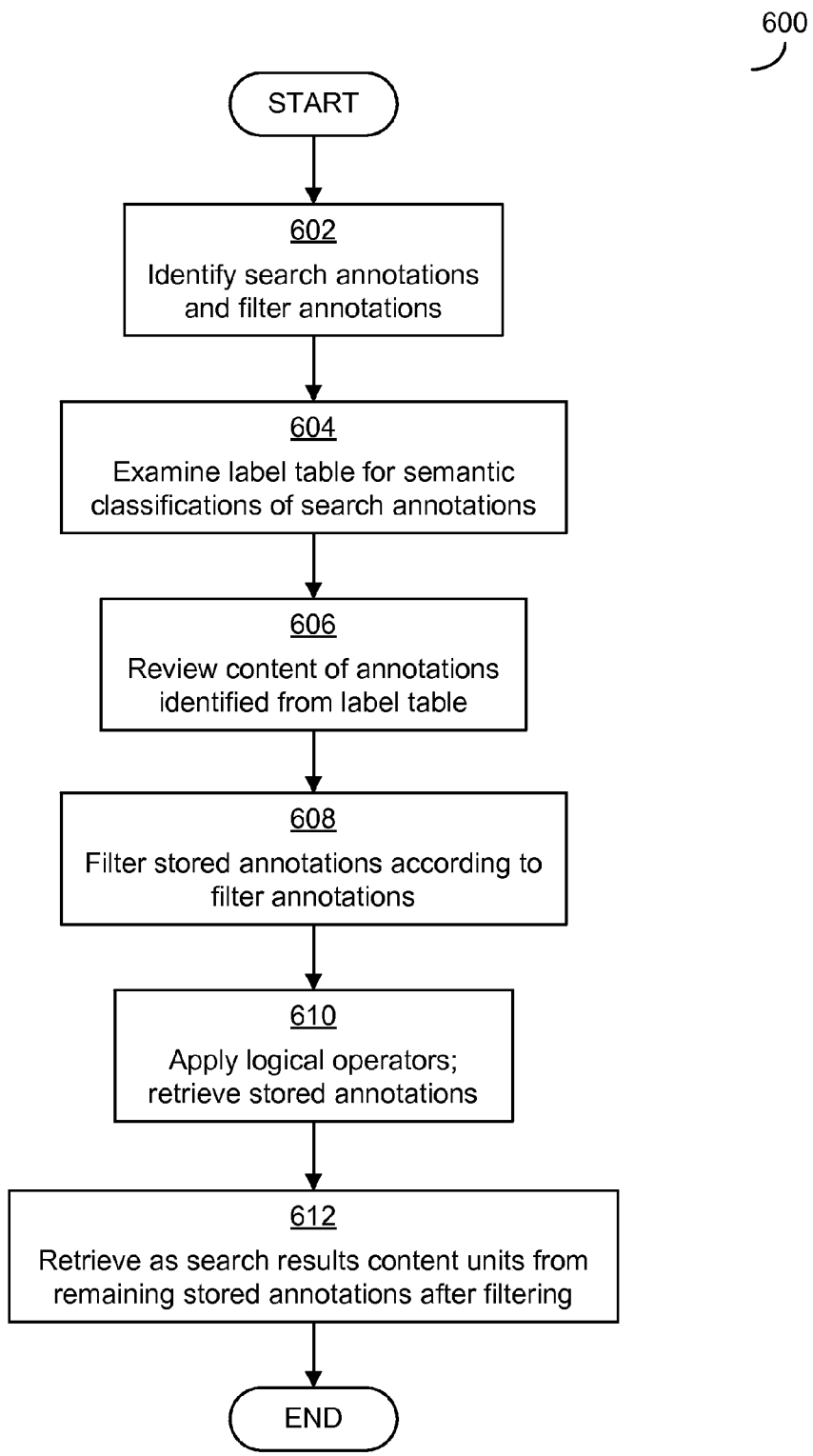
FIG. 6 is a flowchart of an illustrative process for performing a database search based on a natural language query in accordance with some embodiments.

FIG. 6 illustrates a process that may be carried out by a query engine to conduct a search of a database based on annotations determined from a semantic interpretation of a query received from a user. In some cases, a query received from a user may result in the performance of multiple searches of the database, each of which may include different search parameters. In some such cases, the process 600 may be repeated for each of the searches. Prior to the start of the process 600 of FIG. 6, one or more content units and annotations regarding content units have been stored in a database and a user has provided a natural language query identifying information the user would like from the database. In addition, the query provided by the user is semantically interpreted and one or more annotations are determined from the query.

The process 600 begins in block 602, in which the query engine identifies search annotations and filter annotations from the annotations determined from the query, and further identifies logical operators included in the query. The query engine may identify search annotations as annotations on which an inclusive first search of the database may be carried out, and may identify filter annotations as annotations in the query by which results of the inclusive first search may be filtered. For example, the query engine may identify concept annotations as keywords on which a first search of the database may be conducted, and may identify other annotations, such as organizational annotations, as filter annotations by which to filter results of the first search. In some cases, the query engine may identify search annotations and filter annotations based on the way in which annotations are stored in the database.

For example, filter annotations may be defined as those annotations for which a search of the database would primarily depend on the relationship table (e.g., the relationship table 216 of FIG. 2 that identifies relationships between annotations). In some databases, a determination of whether a particular concept annotation was extracted from a semantic interpretation of a particular section of a document (e.g., whether the concept "nausea" appeared in the section "History of present illness" in a document) may depend primarily on relationships between annotations and on whether the concept annotation is related to a particular organizational annotation. Determining whether a concept annotation is related to a particular organizational annotation may depend on an evaluation of relationships between annotations defined by the relationship table. For example, the relationship table may identify that a concept annotation is related to an organizational annotation when a word or phrase of a document that expresses the concept to which the concept annotation relates appears in the document in a section of the document to which the organizational annotation relates. As a particular example, the semantic interpretation engine may identify a relationship between a concept annotation for "fever" and an organization annotation relating to a "Symptom" section of a document when the Symptom section of the document includes words relating to a fever (e.g., an explicit mention of fever or a patient's temperature that is above the cutoff for a fever). When the semantic interpretation engine identifies the relationship, an indication of the relationship may be stored in the relationship table.

Search annotations, on the other hand, may be identified by the query engine as those annotations determined from the query for which a search of the database would primarily depend on the label table and/or content tables. Logical operators included in the query may include Boolean operators like "and," "or," "not," etc. A user may use logical operators to further define the content units the user seeks as results of the search, such as content units that include one annotation "and" another annotation, or content units that include one annotation but "not" another annotation.

Once the search annotations and filter annotations have been identified in block 602, the query engine may, in block 604, examine a label table of the database for labels corresponding to labels of the search annotations. From the examination of the label table, the query engine may identify annotations stored in the database that have labels that match the labels for the annotations determined from the query. In other words, from the examination of the label table, the query engine may determine annotations that have the same semantic classification as annotations determined from the query. The query engine may then retrieve from the label table annotation identifiers for each of the annotations that have the same labels as the annotations determined from the query. In block 606, the query engine may perform a similar search of content tables of the database for the content of the annotations determined from the query. From the examination of the content tables, the query engine may identify annotations stored in the database that have the same content as the content of the annotations determined from the query. The query engine may also retrieve annotation identifiers from the contents tables for annotations that match the content of the annotations determined from the query. The query engine may then compare the annotation identifiers determined from the label table and the annotation identifiers determined from the content tables to identify annotations stored in the database having both labels and content that match the labels and content of annotations determined from the query.

From the label table and the content table, the query engine determines a set of annotations stored in the database that match the semantic classification and the content of annotations determined from the query. This set of annotations determined from the label and content tables are then evaluated using the filter annotations and logical operators determined from the query provided by the user to determine which (if any) of them satisfy all of the user's search criteria.

In block 608, the query engine filters the set of annotations determined from the label and content tables according to the filter annotations. As discussed above, while the search annotations may be used to carry out an inclusive first search of the database to determine a set of annotations, the filter annotations may be used to select some annotations from the set of annotations that meet all of the criteria of the query provided by the user. For example, as discussed above, in some cases the filter annotations may relate to relationships between annotations that may be identified by the relationship table of the database. As discussed above, a semantic interpretation of a content unit to determine annotations may identify, for those annotations, relationships between the annotations. For example, a semantic annotation may identify token annotations for tokens (e.g., words) from which the concept identified by the semantic annotation was identified. As another example, a semantic annotation or a structural annotation may identify a section or other organizational unit of a content unit from which the semantic or structural annotation was identified. When the annotations are stored in the database, the relationships between the annotations may be stored in the relationship table. In some cases, the relationships may be stored as a direct identification of a relationship; for example, a pair of related annotations and their identifiers may be stored as a row in the relationship table. In other cases, however, a relationship between annotations (e.g., one that is not direct) may not be identified by a single row in the relationship table. For example, in some cases, a semantic annotation may identify a grammatical annotation to which the semantic annotation relates, and that grammatical annotation may identify an organizational annotation to which the structural annotation relates. By examining relationships (identified by the relationship table of the database), between the semantic annotation the grammatical annotation, and between the grammatical annotation and the organizational annotation, a relationship between the semantic annotation and the organizational annotation may be determined.

Accordingly, in block 608, the query engine may filter the set of annotations determined from the label table and the content table based on the filter annotations. The label table and content tables may be searched in block 608 as part of the filtering, and in some cases the relationship table may be evaluated as part of carrying out the filtering. For example, where a filter annotation is an organizational annotation, the label table may be searched to identify annotations having the label for the type of organizational unit to which the organizational annotation relates (e.g., "section"). The content table may then also be searched to identify annotations having the content of the organizational annotation determined from the query. From the review of the label table and content table, an annotation identifier for each annotation having the label and content of the organizational annotation determined from the query may be identified. This annotation identifier may then be used to search the relationship table of the database based on annotation identifiers for each of the annotations determined from the search in block 604 and 606 to determine annotations relating to the organizational unit to which the organizational annotation determined from the query relates.

In block 610, once the results from the search annotations have been filtered, the query engine applies logical operators to the annotations resulting from the filtering to determine content units that include annotations with the relationships identified by the logical operators. For example, a natural language query may include one or more logical operators. For example, a semantic interpretation of a natural language query may identify that a user desires content units that include annotations "A, B, or C," while a semantic interpretation of another natural language query may identify that a user desires content units that include annotations "A or B, and also C" (in these examples, for simplicity, A, B, and C each represents an annotation determined from the query). On the basis of the one or more logical operators, the query engine may select some or all annotations in the set of annotations determined from the searching and filtering of blocks 604-608.

As discussed above, in some embodiments the entry in the label table for each annotation includes an identifier for the content unit to which the annotation relates. For each annotation in the set of annotations determined from the database in blocks 604-608, the query engine may determine the content unit corresponding to the annotation. The query engine may select the content units that correspond to the annotations having the relationship(s) specified by the logical operator(s). For example, where the query specifies a logical operator that is an inclusive "or" operation between two or more annotations determined from the query, the query engine may identify from the set of annotations those annotations extracted from content units that include any of the annotations related by the logical operator. As another example, where the query specifies a logical operator that is an "and" operation between two or more annotations determined from the query, the query engine may identify from the set of annotations only those annotations extracted from content units that include all of the annotations related by the logical operator.

In some cases, the meaning of logical operators provided by a user in a query may be ambiguous, as users may use logical operators in different ways. Some users may use an "and" operator to mean that all of the terms of the query connected by the operator should be included in a content unit for the content unit to be returned as the result of a search. Conversely, other users may use an "and" operator to mean that at least one of the terms of the query by the operator should be included in a content unit. Exemplary processes for addressing ambiguous logical operators are discussed below in connection with FIG. 7.

The query engine, by searching in block 604 and 606, filtering in block 608, and filtering on the basis of logical operators again in block 610, determines a set of content units having annotations that correspond to the annotations determined from the query. The content units are the results of the search of the database and, in block 612, the query engine retrieves the content units and provides them to the user as results of the query. The content units may be provided in any suitable manner, as embodiments are not limited in this respect. In some embodiments, the full content of the content units may be provided to the user as results of the query. In other embodiments, a list of the content units may be provided to the user as results of the query. Such a list may include any suitable information about the content units, such as a title of the content units, an excerpt from the content units, and/or any other information.

Once the content units are provided to the user as results of the search, the process 600 ends.

The process 600 describes the process of searching a database in a step-by-step fashion of searching one table, searching another table, comparing results, filtering, etc. For ease of understanding, these operations were discussed as separate operations of searching the database and reviewing results of the search before continuing on to a next search. It should be appreciated, however, that in some embodiments each of the operations described above in connection with FIG. 6 may be carried out as a result of a single search string provided to a database, such as a single SQL search string provided to the database. The query engine, when defining the search on the basis of the annotations determined from the query, may account for each of the operations discussed above when defining the search string. For example, in some embodiments, a database storing annotations using a label table and content tables may define a link between a row in the label table and one or more rows in the content tables that relate to the same annotation. Thus, while the searching of the label and content tables are discussed as separate operations in FIG. 6, in some embodiments a database may enable a search of the label table and the content tables to be carried out with one search string that includes, for example, a SQL "JOIN" operation to jointly query the label, content, and relationship tables.

As discussed above, some queries of the database may be defined using logical operators, such as "and," "or," etc. Such operators may have precisely defined meanings in mathematics and logic. However, the ways in which these operators are used in common language may vary from these precise meanings. For example, a person may use the operator "and" on a list of search criteria to indicate that results should include one or more of the search criteria, even though the formal definition of the "and" operator would require that all of the search criteria be met. As another example, a person may use the operator "or" on a list of search criteria to indicate an "exclusive or" (i.e., meets one criteria, or the other criteria, but not both), even though the formal definition of the "or" operator is inclusive, meaning that any or all of the criteria could be met. As a third example, a person may use the operator "not" on a list of search criteria, in connection with a term of the query, to indicate that the term should not be present in a document (e.g., "not A" indicating that a document should not include the concept A). Another person, however, may use the operator "not" on a list of search criteria, in connection with a term of the query, to indicate that the term should be present in the document in a negated form (e.g., "not A" indicating that a document should explicitly or implicitly include a concept that is the negation of concept A). In some embodiments that permit natural language querying of a database, to ensure that users are able to define a query using any structure or phrasing they desire, the query engine accounts for the differences in the ways these operators are used.

Some embodiments may account for the different uses of the logical operators by prompting a user to disambiguate the use of the logical operator in the query. For example, the query engine may provide a prompt to the user identifying the multiple different possible meanings of a logical operator in the query provided by the user and asking the user to select the meaning intended. In other embodiments, the query engine may account for the different meanings of the logical operators by performing multiple different searches of the database based on the multiple different meanings of the logical operators.

Figure 7:
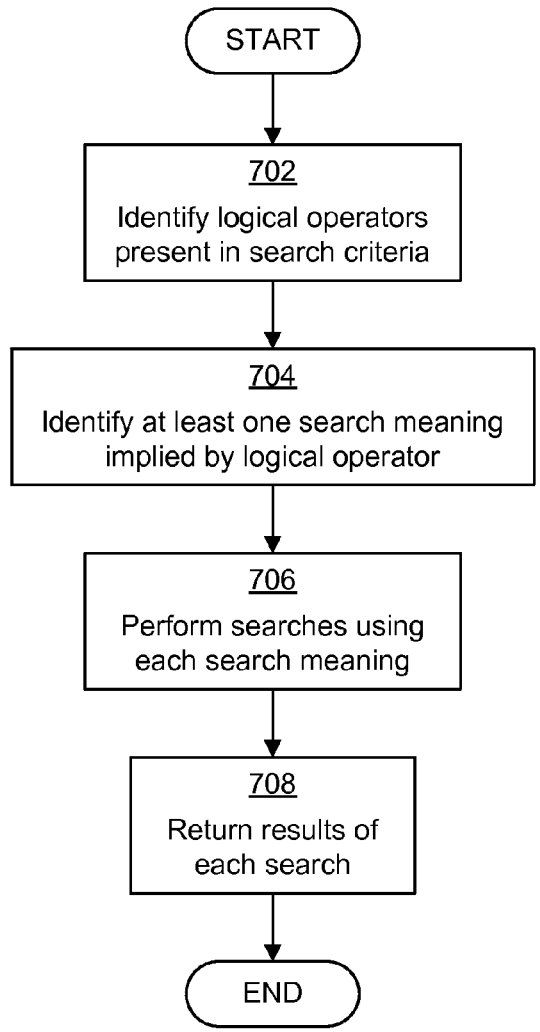
FIG. 7 is a flowchart of an illustrative process for evaluating logical operators contained in a natural language database query in accordance with some embodiments.

FIG. 7 illustrates one process that may be carried out in some embodiments by a query engine to account for ambiguous logical operators included in a search. Prior to the start of the process 700, one or more content units and annotations regarding the content units are stored in a database. Additionally, a query engine has received and semantically interpreted a query specifying search criteria by which a search of the database is to be conducted.

The process 700 begins in block 702, in which the query engine identifies logical operators present in search criteria. In some embodiments, the logical operators may define a desired relationship between two or more annotations determined from a query. In block 704, the query engine identifies at least one search meaning implied by the use of the logical operator in the query. The at least one search meaning may include a meeting based on a formal, mathematical definition of the logical operator included in the search query, and/or one or more other meanings implied by common uses of the logical operator. The one or more other meanings implied by common use may be identified by common use of the logical operator in the language in which the query is written and/or common use in a domain to which the content units stored in the database and/or the search query relates. For example, when the query is specified in the English language and the database stores clinical content units, the one or more other meanings of the logical operator may be determined from use of the logical operator in the English language and in the clinical domain.

Upon determining the one or more search meanings implied by the use of logical operator in the query in block 704, the query engine may, in block 706, perform multiple searches of the database using the different search meanings identified in block 704. To perform the different searches of the database, the query engine may specify multiple different search strings to be provided to the database, such as multiple different SQL search strings. Each of the multiple different SQL search strings may specify different relationships between annotations based on the different relationships identified by the different uses of the logical operator identified block 704.

In block 708, once the multiple searches of the database have been carried out in block 706, the query engine may aggregate results of the searches and provide the aggregated results to the user as a result of the query. The results may be aggregated in any suitable manner, as embodiments are not limited in this respect. In some embodiments, the results may be provided to the user as multiple different sets of results, each having an identification of the search and the meaning of the logical operator used in generating the results. By providing the results of the different searches separately, the user may be able to identify the set of searches corresponding to the meaning intended by the user and review only those results. In other embodiments, however, the results of the different searches may be aggregated and provided to the user as a single set of search results.

Once the results have been provided to the user in block 708, the process 700 ends.

In some cases, a semantic interpretation of a text may produce multiple different semantic and/or structural annotations, each of which may be used as the basis of a search of the database. For example, structural annotations identifying the explicit content of the query may be used to query the database. As another example, semantic annotations identifying meanings expressed in the query may be used as the basis of the search. Further, multiple different semantic annotations may be determined. In the example "My cat is brown." discussed above, semantic annotations related to the concepts "cat" and "brown" were identified, and semantic annotations related to the facts "brown cat" and "the 'brown cat' belongs to 'me'" were identified.

Any or all of the annotations determined from a query may be used as the basis of a search of a database. In some cases, however, using all of the annotations determined from a query as parameters of a search may lead to a search that is too narrowly defined (i.e., it includes too many parameters) and the search may not produce from the database the results desired by the user. Thus, a query engine may be configured to select only some of the annotations to use in defining the search. In embodiments that include a query engine configured to select annotations for defining a search, the query engine may be configured to do so in any suitable manner.

In some embodiments, the query engine may be configured to select only some of the annotations in a query for use in the search based on a determination of which annotations from the query are the most meaningful. The query engine may do so based on a ranking of annotation types with which the query engine is configured. For example, the query engine may be configured to perform a search based on "fact" annotations when such annotations are determined from a query, because a database designer may identify "fact" annotations as being the most meaningful annotations that can be determined from a query. The query engine may also be configured to perform a search based on "concept" annotations when such annotations are determined from a query and "fact" annotations have not been determined from the query, or when a search based on the "fact" annotations did not produce results. Other forms of semantic annotations determined from a query may also be used as the basis of a search. A ranking may also be maintained of structural annotations, such as organizational annotations and grammatical annotations. In some embodiments, a query engine may be configured to perform a search based on organizational annotations before grammatical annotations (e.g., section annotations before word annotations) or on some grammatical annotations before other grammatical annotations (e.g., phrase annotations before word annotations). It should be appreciated that embodiments that select annotations according to a ranking are not limited to using any particular ranking of annotations.

A query engine may also determine multiple annotations from a query, and select only some of those annotations on which to base a search of the database when the wording of a query is ambiguous. Ambiguities in natural language queries are not limited to logical operators, and may also arise when an evaluation of a query produces multiple annotations having different meanings.

Words or phrases may have multiple different meanings based on the context in which those words or phrases are used. It is possible, then, that a word or phrase used in a natural language query may have multiple different potential meanings. For example, the word "bank" was discussed above as having multiple different meanings. When interpreted in a financial context, the word means financial institution, while when interpreted in a topographical context the word may relate to the edge of a river (i.e., riverbank). When content units stored in the database are related to only a single domain and the semantic interpretation engine is configured to interpret the query using only that domain, a query may not be ambiguous or it may be possible to disambiguate the meaning of words or phrases included in a natural language query by selecting the meaning that corresponds to the domain to which the content units relate. In some embodiments, then, a query engine may be configured to select annotations from a query that relate to a meaning that corresponds to the domain of a database. However, in other embodiments, a database may include information related to multiple different domains and a semantic interpretation engine may be configured to interpret a query according to a generic domain for a language in general and/or according to multiple specific domains. In some such other embodiments, a query engine may be configured to select annotations from queries based on a ranking of domains to which the annotations correspond. For example, in some embodiments a query engine may be configured to select annotations that correspond to meanings in a primary domain of the database before selecting annotations that correspond to other domains, where the primary domain may be a domain that corresponds to a most significant topic of content units stored in the database. As a particular example of such embodiments, a database may store clinical content units according to annotations determined from a semantic interpretation for a clinical domain and from a semantic interpretation according to a generic domain for general meanings of phrases in American English (or any other language). A query engine for the database may be configured to select for a search of the database annotations that correspond to clinical meanings of words and phrases before selecting annotations that correspond to general meanings of words and phrases in American English (or any other language).

Ambiguities may also arise from a query because, when a user provides a query to the database engine, a user may have chosen to express concepts in the query to form the basis of a semantic search of a database or may have chosen to include words or phrases in the query to form the basis of a traditional keyword search of the database. A query engine may be configured to perform both a semantic search of the database based on annotations determined from a semantic interpretation of a query and to perform a traditional keyword search of the database based on words and phrases included in a query. In some embodiments, a database designer may configure the query engine with a ranking of types of searches to be performed, including a ranking that identifies that a semantic search should be performed before a keyword search.

A natural language query provided to a database may therefore be ambiguous in multiple different ways, in that a query engine may be able to perform multiple different queries on the basis of one natural language query. In some cases a database designer may be able to identify in advance the multiple different meanings of search queries that may be encountered by a query engine in response to a natural language query provided by a user. The database designer may therefore be able to identify a manner in which the query engine should search the database in response to an ambiguous query. For example, the database designer may identify a ranking of the meanings that may be implied by a natural language query and configure the query engine to conduct searches based on the order identified by the ranking.

Figure 8:
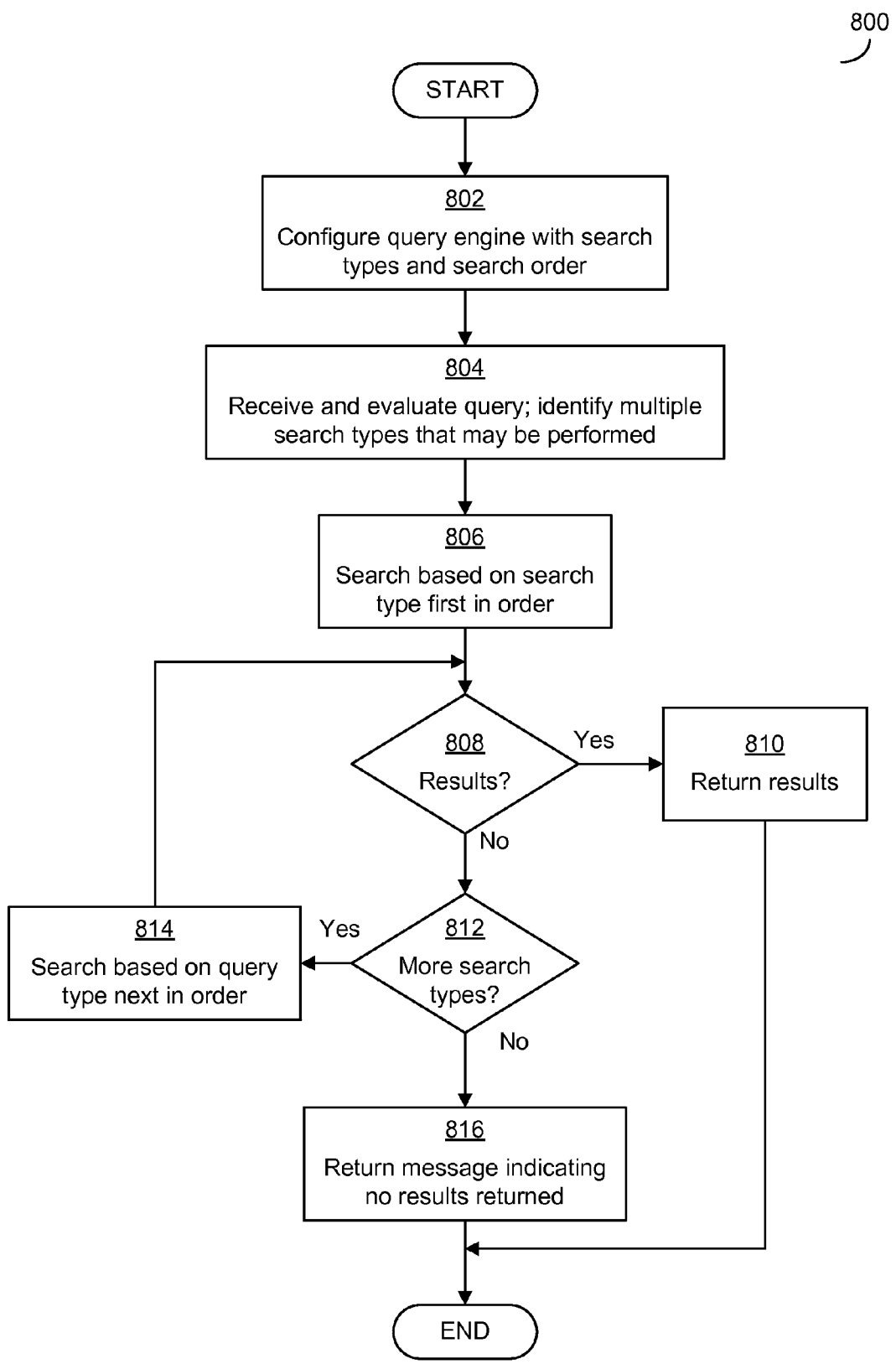
FIG. 8 is a flowchart of an illustrative process for performing a database search based on an ambiguous natural language query in accordance with some embodiments.

FIG. 8 illustrates an exemplary process that may be carried out to perform a search of a database based on a natural language query provided by a user. The process 800 of FIG. 8 begins in block 802, in which a database designer for the database configures the query engine with various types of searches that may be performed based on input received from a natural language query received from a user and configures the query engine with an order in which a search of each type should be carried out by the query engine.

Each of the search types with which the query engine is configured in block 802 may relate to a different way in which a natural language queries provided to the query engine may be understood. For example, the multiple different search types may include searches based on different types of annotations. The database designer may, in block 802, configure the query engine to search based on "fact" annotations determined from a query prior to performing a search based on "concept" annotations. Additionally or alternatively, the database designer may configure the query engine to perform a search based on semantic annotations determined from a query before performing a search based on structural annotations determined from the query. As another example, a database may be configured to store clinical documents and a semantic interpretation engine for the database may be configured to interpret queries according to a meaning in the clinical domain and according to meanings of words as generally used in a general language (e.g., American English or another language). In some cases, then, a query received from a user, when interpreted by the semantic interpretation engine, may be ambiguous (e.g., for a word or phrase) between a clinical meaning and a meaning as generally used in a language. A database designer may configure the query engine in block 802 to, when a meaning of a query is ambiguous between a clinical meaning and a general meaning in a generic domain related to a language, search the database based on a clinical meaning of the query before searching the database based on the general meaning in the language. As a third example, the database designer may configure a query engine to perform a semantic search of a database based on a query received from a user before performing a keyword search of a database based on the query. The query engine may be configured to perform a semantic search based on annotations determined from the query and, if no results are returned based on a search of the database based on the annotations, subsequently perform a keyword search using the words explicitly included in the query provided by the user. The query engine may be configured to perform the keyword search in any suitable manner, including by performing a keyword search on content of the content unit stored in the database or by performing keyword search on annotations relating to content units. If the query engine is configured to perform a keyword search on content of the content unit, the keyword search may be performed on content stored in a content unit table of the database, such as the content unit table 218 of FIG. 2. If the query engine is configured to perform a keyword search on annotations, the query engine may perform the keyword search on any suitable portion of the annotations, such as labels and/or content of the annotations.

Accordingly, in block 802, the database designer may configure the query engine to perform multiple different searches of the database based on a query provided by a user. It should be appreciated that the data based designer not limited to configuring the query engine to operate on any particular type of query, and that the types of queries described above are merely illustrative of the types of queries that a database designer may configure the query engine to use.

Once the query engine is configured in block 802, the query engine may be used to perform a search of a database based on a query received from a user.

In block 804, query engine receives a query from a user and evaluates the query. The evaluation of the query may include using a semantic interpretation engine to determine different sets of one or more annotations from the query. Where the semantic interpretation engine may determine different sets of annotations are determined from the query, any suitable sets of annotations may be determined. Examples of different sets of annotations include sets that include different types of semantic annotations. A set may include one type of annotation that is semantic annotations and a different set may include a different type of annotation that is structural annotations. As another example, a set may include one type of semantic annotation (e.g., "concept" annotation) and another set may include another type of semantic annotation (e.g., "fact" annotation). As another example, a set may include annotations determined for one domain and another set may include annotations determined from a different domain. In cases in which the different sets include annotations related to different domains, the domains may be any suitable set of domains. For example, the domains may include two or more specific domains of which each relates to a particular topic, like a clinical domain, and/or two or more generic domains of which each is not related to a specific topic, such as two or more generic domains of which each relates to a different language). As a result of the evaluation, the query engine may determine that multiple different types of searches may be made on the basis of the query received from the user, each of which searches may relate to a different set of annotations determined from the query.

As a result of the configuring of block 802, the query engine may be configured to apply each of the types of searches identified in block 804 in an order. Accordingly, in block 806, the query engine may define a search of the database, based on the query, using the search type identified first in the order with which the query engine is configured. The query engine may then search the database based on the defined search and, in block 808, determine whether one or more results have been identified as a result of the search performed.

If the query engine determines that the search that was performed has produced one or more results, those results may be returned in block 810 as the results of the query requested by the user. The results may be returned without performing any of the other types of searches identified by the query engine on the basis of the query provided by the user. This may be done because the database designer has configured the query engine with the ranking of search types based on the way in which the database designer expects users to desire the search be conducted. Thus, when one search of the database returns results, the query engine may not continue on to other types of searches that are ranked lower in the list created by the database designer, but may instead provide the results to the user.

However, if the query engine determines in block 808 that the search of the database did not produced results, the query engine may, in block 812, determine whether there are other types of searches identified in block 804 that the query engine has not yet performed. If so, the query engine reviews the order of search types with which the query engine is configured to determine a next type of search to be conducted and, in block 814, defines a search based on that type. The query engine may then carry out the new search of the database and return to block 808 to determine whether the new search of the database has produced results.

If, however, the query engines determines in block 812 that the query engine has already performed searches for all of the search types identified in block 804, the query engine may, in block 816, return to the user a message indicating that the user's query did not produce results from the database.

The query engine may continue defining new types of searches and performing those searches until the query engine determines in block 808 that a search has yielded results, or the query engine determines in block 812 that every type of search identified in block 804 has been performed and returns the message in block 816. Once the query engine returns results in block 810 or the message in block 816, the process 800 ends.

It should be appreciated that embodiments that include a query engine capable of performing multiple different search types on the basis of a natural language query received from a user are not limited to performing the exemplary process illustrated in FIG. 8. Rather, some embodiments may perform a different process for carrying out the multiple different search types. For example, in some embodiments, instead of returning to a user the results of only one search type, as discussed above in connection with FIG. 8, a query engine may perform each of the search types and return to the user results corresponding to each of the search types. When results of multiple different search types are returned to a user, the results may be provided to the user as different sets of results and identification may be made to the user of the type of search that produced each set of results. By identifying the type of search corresponding to each set of results provided to the user, the user may be able to consult the identification of search types and review the set of search results that corresponds to the search that the user desired to be carried out.

It should be appreciated that embodiments are not limited to performing only natural language queries of databases, and that databases operating according to techniques described herein may be searched in any suitable manner. For example, some embodiments may be adapted to carry out a traditional keyword search on a database operating according to techniques described herein. In embodiments that enabling traditional keyword search to be performed, the keyword search may be performed in any suitable manner. A keyword word search may be performed on annotations stored in a database, such as a keyword search performed on information stored in a label table and/or content tables of the database. Additionally or alternatively, a keyword search may be performed on the content of a content unit that is stored in the database, such as by reviewing the content stored in a content unit table of the database.

Figure 9:
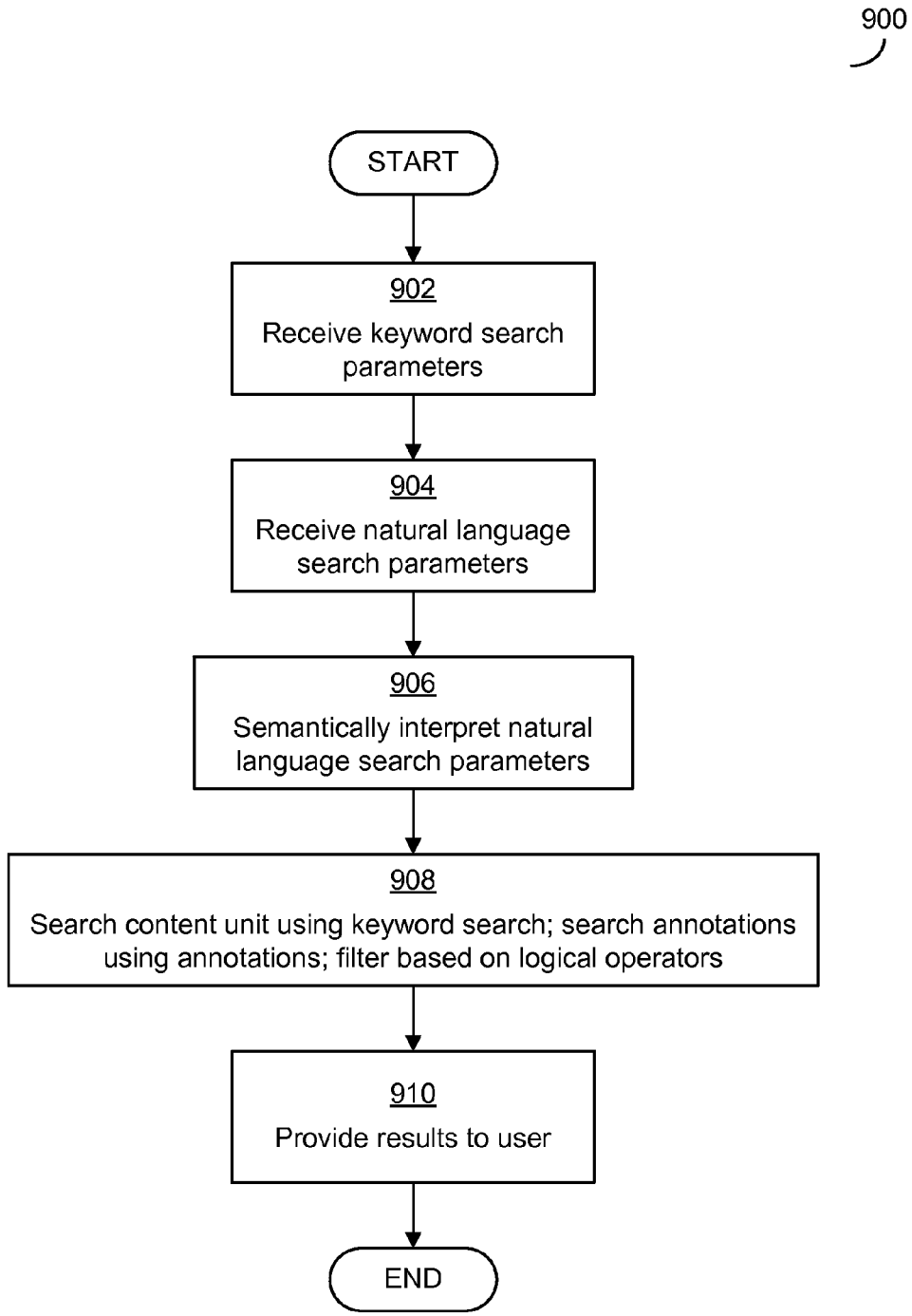
FIG. 9 is a flowchart of an illustrative process for performing a database search based on a combination of a natural language query and a traditional keyword search in accordance with some embodiments.

In some embodiments, a query engine may be configured to perform a combination of a keyword search and a semantic search on the basis of annotations determined from a natural language query. For example, a user may specify a query as a combination of keywords and a natural language query, separately identifying both parts of the query. FIG. 9 illustrates an exemplary process that may be carried out by a query engine in some embodiments, when a user specifies a search as a combination of keywords and a natural language query.

Prior to the start of the process 900 of FIG. 9, content units and annotations regarding content units may be stored in a database and a query engine for the database may be configured to perform a semantic interpretation of queries received from a user according to an annotation model that matches an annotation model used to determine the annotations stored in the database.

The process 900 begins in block 902, in which the query engine receives keyword search parameters from a user defining a portion of a search to be performed of the database. In block 904, the query engine also receives natural language search parameters from the user defining a second portion of a search to be performed at the database. In block 906, the query engine evaluates natural language search parameters provided by the user, including by semantically interpreting the natural language search parameters to determine one or more annotations from the natural language search parameters.

The query engine may then specify a search on the basis of the keyword search parameters received in block 902 and the annotations determined in block 906, and may carry out a search of the database. To search the database, the query engine may search content of the content unit, as stored in a content unit table of the database, on the basis of the keyword search terms to identify a set of content units that include the keywords provided by the user. Additionally, the query engine may search annotations stored in the database, including by searching a label table, content tables, and/or a relationship table of the database, based on the annotations determined from the query in block 906. From the search of the annotations stored in the database, the query engine may determine a set of content units that are related to annotations matching the annotations determined from the query in block 906. The query engine may then compare the content units determined from the keyword search and the content units determined from the search of the annotations to determine a set of content units to be provided as results of the search. The comparison of the content units may be carried out in any suitable manner, including according to logical operators provided by the user identifying a desired relationship between the results of the keyword search and the results of the annotation search. For example, a user may provide a logical operator that is an "and" operator identifying that a content unit should be returned as a result the search when the content unit matches both the keyword search parameters and the natural language search parameters. Alternatively, a user may provide a logical operator that is an "or" operator identifying that a content unit should be returned as a result of the search when the content unit matches either or both of the keyword search parameters and the natural language search parameters. It should be appreciated that embodiments are not limited to operating with any particular relationship between content units determined as a result of the keyword search and content units determined as a result of the annotation search, but instead may operate with any suitable relationship specified by a user.

Once the set of content units is determined from the database on the basis of the search requested by the user, the query engine may provide the results of the search to the user as results of the query requested by the user. Once the results of been provided to the user by the query engine, the process 900 ends.

In some embodiments, techniques described herein may be carried out using one or more computing devices. Embodiments are not limited to operating with any particular type of computing device.

Figure 10:
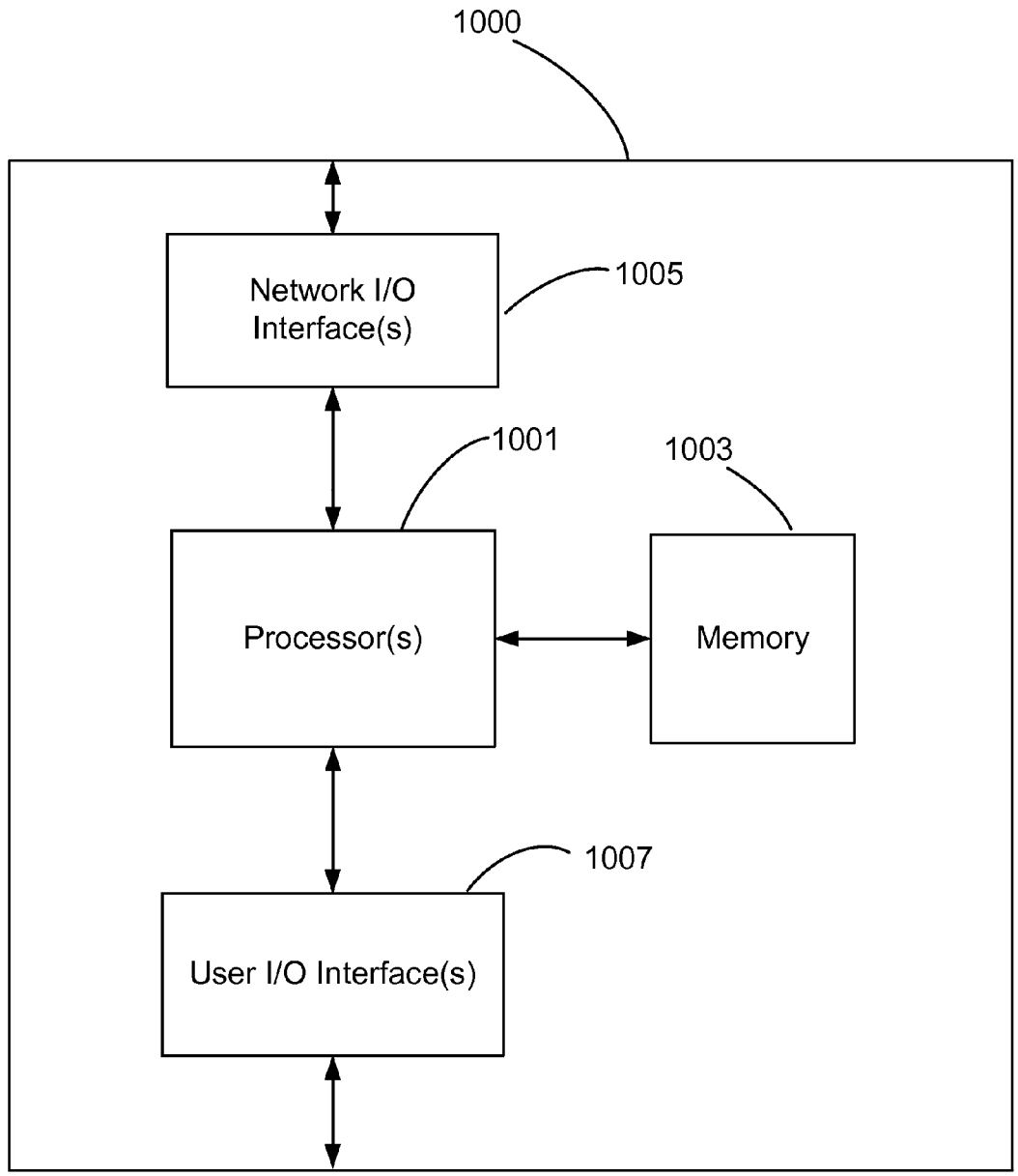
FIG. 10 is a block diagram of an exemplary computing device on which some embodiments may be implemented.

FIG. 10 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (e.g., a computer memory, a floppy disk, a compact disk, a magnetic tape, or other tangible, non-transitory computer-readable storage medium) encoded with a computer program (i.e., a plurality of executable instructions) that, when executed on one or more processors, performs the above-discussed functions of one or more embodiments of the present invention. The computer-readable medium can be transportable such that the program stored thereon can be loaded onto any computing device to implement aspects of the present invention discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement above-discussed aspects of the present invention.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for searching a database of information, the database of information comprising information related to a plurality of content units, the information related to the plurality of content units comprising a plurality of stored annotations related to the plurality of content units, the plurality of stored annotations having been generated by processing the plurality of content units using a first semantic interpretation engine, the first semantic interpretation engine processing the plurality of content units according to at least one annotation model, the method comprising:

receiving a query;

determining at least one query annotation relating to the query by processing the query using a second semantic interpretation engine, the second semantic interpretation engine processing the query according to the at least one annotation model, wherein the at least one query annotation comprises a first query annotation, wherein the first query annotation comprises a semantic label for the first query annotation and content of the first query annotation; and searching the database based at least in part on the first query annotation, wherein the at least one annotation model of the first and second semantic interpretation engines defines at least one annotation type and, for each annotation type of the at least one annotation type, a semantic label for the annotation type and a format of content for the annotation type, wherein the semantic label for an annotation type defined by the at least one annotation model describes a meaning of content of an annotation having the annotation type in context of a content unit from which the content was extracted and that is annotated by the annotation, wherein each stored annotation of the plurality of stored annotations is of an annotation type of the at least one annotation type and annotates a content unit of the plurality of content units, each stored annotation of the plurality of stored annotations comprising the semantic label for the annotation type of the stored annotation and content that was extracted from the content unit that the stored annotation annotates and is of the format defined by the at least one annotation model for content of the annotation type, wherein each query annotation of the at least one query annotation is of an annotation type of the at least one annotation type, each query annotation comprising the semantic label for the annotation type of the query annotation and content that was extracted from the query and is of the format defined by the at least one annotation model for content of the annotation type.

2. The method of claim 1, wherein the determining the at least one query annotation using the second semantic interpretation engine comprises determining a plurality of query annotations, the plurality of query annotations comprising one or more query annotations identifying information having a medical significance and one or more query annotations identifying information that does not have a medical significance.

3. The method of claim 2, wherein the searching the database based at least in part on the first query annotation comprises:
selecting, from the plurality of query annotations, the one or more query annotations identifying information having a medical significance, the one or more query annotations identifying information having a medical significance comprising the first query annotation; and
searching the database based at least in part on the one or more query annotations.

4. The method of claim 1, wherein:
the determining at least one query annotation related to the query comprises determining a plurality of query annotations related to the query using the second semantic interpretation engine; and
the method further comprises:
selecting a selected group of one or more query annotations of the plurality of query annotations based at least in part on a ranking of types of query annotations, wherein selecting the selected group comprises selecting one or more query annotations of one or more types that are ranked higher than one or more types of one or more unselected second query annotations, the selected group comprising the first query annotation; and
searching the database based at least in part on the first query annotation comprises searching the database based at least in part on the selected group of the plurality of query annotations.

5. The method of claim 1, wherein:
the first semantic interpretation engine processes the plurality of content units according to at least one first annotation model that is a first copy of the at least one annotation model that defines the at least one annotation type;
the determining the at least one query annotation relating to the query by processing the query using the second semantic interpretation engine comprises using the second semantic interpretation engine to process the query according to at least one second annotation model, the at least one second annotation model being a second copy of the at least one annotation model defining the at least one annotation type, the second copy of the at least one annotation model being a different copy than the first copy.

6. The method of claim 1, wherein:
the at least one annotation type defined by the at least one annotation model comprises a first plurality of annotation types, each of the first plurality of annotation types defining an annotation having content in a format;
the determining the at least one query annotation relating to the query by processing the query using the second semantic interpretation engine that processes the query according to the at least one annotation model comprises using a second semantic interpretation engine that processes the query according to at least one second annotation model that comprises the at least one annotation model, the at least one second annotation model defining a second plurality of annotation types, the second plurality of annotation types comprising the first plurality of annotation types.

7. The method of claim 1, wherein:
the at least one annotation type defined by the at least one annotation model comprises a plurality of annotation types;
the at least one annotation model is adjusted over time to alter the plurality of annotation types defined by the at least one annotation model;
at least a portion of the plurality of content units were processed by the first semantic interpretation engine at a first time according to the at least one annotation model, the at least one annotation model defining, at the first time, a first plurality of annotation types; and
the determining the at least one query annotation relating to the query by processing the query using the second semantic interpretation engine comprises using, at a second time later than the first time, the second semantic interpretation engine that processes the query according to the at least one annotation model, the at least one annotation model defining, at the second time, a second plurality of annotation types, the second plurality of annotation types defined by the at least one annotation model at the second time being compatible with the first plurality of annotation types defined by the at least one annotation model at the first time.

8. The method of claim 7, wherein the second plurality of annotation types defined by the at least one annotation model at the second time comprises the first plurality of annotation types defined by the at least one annotation model at the first time.

9. The method of claim 1, wherein:
the first semantic interpretation engine and the second semantic interpretation engine are a same semantic interpretation engine; and
the determining the at least one query annotation using the second semantic interpretation engine comprises determining the at least one query annotation using the same semantic interpretation engine executing on a same at least one processor as was used to determine the plurality of stored annotations stored in the database.

10. At least one non-transitory computer-readable storage medium having encoded thereon computer-executable instructions that, when executed by at least one computer, cause the at least one computer to carry out a method for searching a database of information, the database of information comprising information related to a plurality of content units, the information related to the plurality of content units comprising a plurality of stored annotations related to the plurality of content units by processing the plurality of content units using a first semantic interpretation engine, the first semantic interpretation engine processing the plurality of content units according to at least one annotation model, the method comprising:
receiving a query;
determining at least one query annotation relating to the query by processing the query using a second semantic interpretation engine, the second semantic interpretation engine processing the query according to the at least one annotation model, wherein the at least one query annotation comprises a first query annotation, wherein the first query annotation comprises a semantic label for the first query annotation and content of the first query annotation; and
searching the database based at least in part on the first query annotation,
wherein the at least one annotation model of the first and second semantic interpretation engines defines at least one annotation type and, for each annotation type of the at least one annotation type, a semantic label for the annotation type and a format of content for the annotation type, wherein the semantic label for an annotation type defined by the at least one annotation model describes a meaning of content of an annotation having the annotation type in context of a content unit from which the content was extracted and that is annotated by the annotation, wherein each stored annotation of the plurality of stored annotations is of an annotation type of the at least one annotation type and annotates a content unit of the plurality of content units, each stored annotation of the plurality of stored annotations comprising the semantic label for the annotation type of the stored annotation and content that was extracted from the content unit that the stored annotation annotates and is of the format defined by the at least one annotation model for content of the annotation type, wherein each query annotation of the at least one query annotation is of an annotation type of the at least one annotation type, each query annotation comprising the semantic label for the annotation type of the query annotation and content that was extracted from the query and is of the format defined by the at least one annotation model for content of the annotation type.

11. The at least one non-transitory computer-readable storage medium of claim 10, wherein the determining the at least one query annotation using the second semantic interpretation engine comprises determining a plurality of query annotations, the plurality of query annotations comprising one or more query annotations identifying information having a medical significance and one or more query annotations identifying information that does not have a medical significance.

12. The at least one non-transitory computer-readable storage medium of claim 11, wherein the searching the database based at least in part on the first query annotation comprises:
   selecting, from the plurality of query annotations, the one or more query annotations identifying information having a medical significance, the one or more query annotations identifying information having a medical significance comprising the first query annotation; and
   searching the database based at least in part on the first query annotation.

13. The at least one non-transitory computer-readable storage medium of claim 10, wherein:
   the first semantic interpretation engine processes the plurality of content units according to at least one first annotation model that is a first copy of the at least one annotation model that defines the at least one annotation type;
   the determining the at least one query annotation relating to the query by processing the query using the second semantic interpretation engine comprises using the second semantic interpretation engine to process the query according to at least one second annotation model, the at least one second annotation model being a second copy of the at least one annotation model defining the at least one annotation type, the second copy of the at least one annotation model being a different copy than the first copy.

14. The at least one non-transitory computer-readable storage medium of claim 10, wherein:
   the at least one annotation type defined by the at least one annotation model comprises a first plurality of annotation types, each of the first plurality of annotation types defining an annotation having content in a format;
   the determining the at least one query annotation relating to the query by processing the query using the second semantic interpretation engine that processes the query according to the at least one annotation model comprises using a second semantic interpretation engine that processes the query according to at least one second annotation model that comprises the at least one annotation model, the at least one second annotation model defining a second plurality of annotation types, the second plurality of annotation types comprising the first plurality of annotation types.

15. The at least one non-transitory computer-readable storage medium of claim 10, wherein:
   the at least one annotation type defined by the at least one annotation model comprises a plurality of annotation types;
   the at least one annotation model is adjusted over time to alter the plurality of annotation types defined by the at least one annotation model;
   at least a portion of the plurality of content units were processed by the first semantic interpretation engine at a first time according to the at least one annotation model, the at least one annotation model defining, at the first time, a first plurality of annotation types; and
   the determining the at least one query annotation relating to the query by processing the query using the second semantic interpretation engine comprises using, at a second time later than the first time, the second semantic interpretation engine that processes the query according to the at least one annotation model, the at least one annotation model defining, at the second time, a second plurality of annotation types, the second plurality of annotation types defined by the at least one annotation model at the second time being compatible with the first plurality of annotation types defined by the at least one annotation model at the first time.

16. An apparatus comprising:
   at least one processor; and
   at least one non-transitory computer-readable storage medium having encoded thereon executable instructions that, when executed by the at least one processor, cause the at least one processor to carry out a method for searching a database of information, the database of information comprising information related to a plurality of content units, the information related to the plurality of content units comprising a plurality of stored annotations related to the plurality of content units by processing the plurality of content units using a first semantic interpretation engine, the first semantic interpretation engine processing the plurality of content units according to at least one annotation model, the method comprising:
   receiving a query;
   determining at least one query annotation relating to the query by processing the query using a second semantic interpretation engine, the second semantic interpretation engine processing the query according to the at least one annotation model, wherein the at least one query annotation comprises a first query annotation, wherein the first query annotation comprises a semantic label for the first query annotation and content of the first query annotation; and
   searching the database based at least in part on the first query annotation
   wherein the at least one annotation model of the first and second semantic interpretation engines defines at least one annotation type and, for each annotation type of the at least one annotation type, a semantic label for the annotation type and a format of content for the annotation type, wherein the semantic label for an annotation type defined by the at least one annotation model describes a meaning of content of an annotation having the annotation type in context of a content unit from which the content was extracted and that is annotated by the annotation, wherein each stored annotation of the plurality of stored annotations is of an annotation type of the at least one annotation type and annotates a content unit of the plurality of content units, each stored annotation of the plurality of stored annotations comprising the semantic label for the annotation type of the stored annotation and content that was extracted from the content unit that the stored annotation annotates and is of the format defined by the at least one annotation model for content of the annotation type, wherein each query annotation of the at least one query annotation is of an annotation type of the at least one annotation type, each query annotation comprising the semantic label for the annotation type of the query annotation and content that was extracted from the query and is of the format defined by the at least one annotation model for content of the annotation type.

17. The apparatus of claim 16, wherein the determining the at least one query annotation using the second semantic interpretation engine comprises determining a plurality of query annotations, the plurality of query annotations comprising one or more query annotations identifying information having a medical significance and one or more query annotations identifying information that does not have a medical significance.

18. The apparatus of claim 17, wherein the searching the database based at least in part on the first query annotation comprises:
selecting, from the plurality of query annotations, the one or more query annotations identifying information having a medical significance, the one or more query annotations identifying information having a medical significance comprising the first query annotation; and
searching the database based at least in part on the first query annotation.

19. The apparatus of claim 16, wherein:
the first semantic interpretation engine processes the plurality of content units according to at least one first annotation model that is a first copy of the at least one annotation model that defines the at least one annotation type;
the determining the at least one query annotation relating to the query by processing the query using the second semantic interpretation engine comprises using the second semantic interpretation engine to process the query according to at least one second annotation model, the at least one second annotation model being a second copy of the at least one annotation model defining the at least one annotation type, the second copy of the at least one annotation model being a different copy than the first copy.

20. The apparatus of claim 16, wherein:
the at least one annotation type defined by the at least one annotation model comprises a plurality of annotation types;
the at least one annotation model is adjusted over time to alter the plurality of annotation types defined by the at least one annotation model;
at least a portion of the plurality of content units were processed by the first semantic interpretation engine at a first time according to the at least one annotation model, the at least one annotation model defining, at the first time, a first plurality of annotation types; and
the determining the at least one query annotation relating to the query by processing the query using the second semantic interpretation engine comprises using, at a second time later than the first time, the second semantic interpretation engine that processes the query according to the at least one annotation model, the at least one annotation model defining, at the second time, a second plurality of annotation types, the second plurality of annotation types defined by the at least one annotation model at the second time being compatible with the first plurality of annotation types defined by the at least one annotation model at the first time.

* * * * *